US012586418B2

(12) United States Patent
Takahashi et al.

(10) Patent No.: US 12,586,418 B2
(45) Date of Patent: Mar. 24, 2026

(54) COMPUTER-READABLE RECORDING MEDIUM STORING INFORMATION PROCESSING PROGRAM, INFORMATION PROCESSING METHOD, AND INFORMATION PROCESSING DEVICE

(71) Applicant: Fujitsu Limited, Kawasaki (JP)

(72) Inventors: Satoru Takahashi, Kawasaki (JP);
Yoshiaki Ikai, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 18/469,463

(22) Filed: Sep. 18, 2023

(65) Prior Publication Data

US 2024/0177526 A1     May 30, 2024

(30) Foreign Application Priority Data

Nov. 29, 2022     (JP) ................................. 2022-190856

(51) Int. Cl.
*G06V 40/20* (2022.01)
*G06T 7/73* (2017.01)

(52) U.S. Cl.
CPC ................ *G06V 40/28* (2022.01); *G06T 7/73* (2017.01)

(58) Field of Classification Search
None
See application file for complete search history.

(56) References Cited

FOREIGN PATENT DOCUMENTS

| JP | 2011-065434 | 3/2011 |
| JP | 2022-006919 | 1/2022 |

OTHER PUBLICATIONS

Effective 3D Action Recognition using EigenJoints. Yang et al. (Year: 2013).*
Xiaodong Yang et al., "Effective 3D action recognition using EigenJoints", Journal of Visual Coomunication and Image Representation, Academic Press, Inc, US, vol. 25, No. 1, Mar. 14, 2013, pp. 2-11, XP028804217.
Santosh Kumar Yadav et al., "Skeleton-based human activity recognition using ConvLSTM and guided feature learning", Soft Computing, Springer Berlin Heidelberg, Berlin/Heidelberg, vol. 26, No. 2., Oct. 1, 2021, pp. 877-890, XP037663882.

(Continued)

*Primary Examiner* — Delomia L Gilliard
(74) *Attorney, Agent, or Firm* — Fujitsu Intellectual Property Center

(57) ABSTRACT

A non-transitory computer-readable recording medium storing an information processing program for causing a computer to execute processing including: acquiring a video image in which a first person appears; identifying positional information about each of two body parts that form a pair among body parts of the first person in the video image, by analyzing the acquired video image; generating a first component that indicates a sum of the identified positional information about each body part; generating a third component that indicates an absolute value of a second component that indicates a difference in the identified positional information about each body part; and training a model that outputs posture information about a second person from a video image in which the second person appears, based on the generated first component and the generated third component.

7 Claims, 22 Drawing Sheets

(56)     References Cited

OTHER PUBLICATIONS

Qiuhong Ke et al., "SkeletonNet: Mining Deep Part Features for 3-D Action Recognition", IEEE Signal Processing Letters, IEEE USA, vol. 24, No. 6, Jun. 1, 2017, pp. 731-735, XP011646193.

Songyang Zhang et al., "Fusing Geometric Features for Skeleton-Based Action Recognition Using Multilayer LSTM Networks", IEEE Transactions on Multimedia, vol. 20, No. 9, Sep. 1, 2018, pp. 2330-2343, XP093118790.

Yingfu Wang et al., "Robust Multi-Feature Learning for Skeleton-Based Action Recognition", IEEE Access, vol. 7, Oct. 4, 2019, pp. 148658-148671, XP011751371.

Li-Chi Liao et al., "Joint-oriented Features for Skeleton-based Action Recognition", 2019 IEEE International Conference on Systems, Man and Cybernetics (SMC), IEEE, Oct. 6, 2019, pp. 1154-1159, XP033668096.

EESR—Extended European Search Report dated Jan. 26, 2024 for corresponding European Patent Application No. 23197124.3 [11 pages].

* cited by examiner

| SECOND | LEFT HAND xl | LEFT HAND yl | LEFT HAND zl | RIGHT HAND xr | RIGHT HAND yr | RIGHT HAND zr |
|---|---|---|---|---|---|---|
| 0 | 63.3 | -75.3 | -51.6 | -25.3 | 98.4 | -7.7 |
| 1 | 71.1 | -66.7 | -47.3 | -22.9 | 96.0 | -7.4 |
| 2 | 80.6 | -65.2 | -43.2 | -13.2 | 95.0 | -5.8 |
| 3 | 76.5 | -67.5 | -42.7 | -13.0 | 96.6 | -8.2 |
| 4 | 57.9 | -77.5 | -46.5 | -13.4 | 101.7 | -12.3 |
| 5 | 75.5 | -66.0 | -44.6 | -15.9 | 92.3 | -11.0 |
| 6 | 64.9 | -78.2 | -47.3 | -28.9 | 92.9 | -11.2 |
| 7 | 153.8 | -11.0 | -46.8 | 171.3 | 201.7 | -343.4 |
| 8 | 72.5 | 27.8 | -145.9 | 98.6 | 205.9 | -370.5 |
| 9 | 145.7 | 32.3 | -238.8 | 87.7 | 179.7 | -319.3 |
| 10 | 156.8 | 34.8 | -277.1 | 107.4 | 200.8 | -336.3 |
| 11 | 165.5 | 34.3 | -314.7 | 125.6 | 193.8 | -350.5 |
| 12 | 163.9 | 1.0 | -177.7 | 54.0 | 155.5 | -177.3 |
| 13 | 65.6 | -81.3 | -50.8 | -22.4 | 97.7 | -3.2 |
| 14 | 73.6 | -61.7 | -37.6 | -14.8 | 99.2 | 1.2 |
| 15 | 65.8 | -65.4 | -39.0 | -14.6 | 95.1 | -1.4 |
| 16 | 75.0 | -64.3 | -39.5 | -15.0 | 96.5 | -1.0 |
| 17 | 64.1 | -67.6 | -44.8 | -22.3 | 92.9 | -4.4 |

BENDING MOTION, LEFTWARD VIDEO DATA
(ABSCISSA AXIS: SECOND, ORDINATE AXIS: PIXEL)

_ _ _LEFT      .......LEFT      _ . _LEFT      _ . _RIGHT      ____RIGHT      _ . . _RIGHT
    HAND xl         HAND yl          HAND zl         HAND xr          HAND yr           HAND zr

1300

| SECOND | LEFT HAND xl | LEFT HAND yl | LEFT HAND zl | RIGHT HAND xr | RIGHT HAND yr | RIGHT HAND zr |
|---|---|---|---|---|---|---|
| 0 | -25.3 | 98.4 | -7.7 | 63.3 | -75.3 | -51.6 |
| 1 | -22.9 | 96.0 | -7.4 | 71.1 | -66.7 | -47.3 |
| 2 | -13.2 | 95.0 | -5.8 | 80.6 | -65.2 | -43.2 |
| 3 | -13.0 | 96.6 | -8.2 | 76.5 | -67.5 | -42.7 |
| 4 | -13.4 | 101.7 | -12.3 | 57.9 | -77.5 | -46.5 |
| 5 | -15.9 | 92.3 | -11.0 | 75.5 | -66.0 | -44.6 |
| 6 | -28.9 | 92.9 | -11.2 | 64.9 | -78.2 | -47.3 |
| 7 | 171.3 | 201.7 | -343.4 | 153.8 | -11.0 | -46.8 |
| 8 | 98.6 | 205.9 | -370.5 | 72.5 | 27.8 | -145.9 |
| 9 | 87.7 | 179.7 | -319.3 | 145.7 | 32.3 | -238.8 |
| 10 | 107.4 | 200.8 | -336.3 | 156.8 | 34.8 | -277.1 |
| 11 | 125.6 | 193.8 | -350.5 | 165.5 | 34.3 | -314.7 |
| 12 | 54.0 | 155.5 | -177.3 | 163.9 | 1.0 | -177.7 |
| 13 | -22.4 | 97.7 | -3.2 | 65.6 | -81.3 | -50.8 |
| 14 | -14.8 | 99.2 | 1.2 | 73.6 | -61.7 | -37.6 |
| 15 | -14.6 | 95.1 | -1.4 | 65.8 | -65.4 | -39.0 |
| 16 | -15.0 | 96.5 | -1.0 | 75.0 | -64.3 | -39.5 |
| 17 | -22.3 | 92.9 | -4.4 | 64.1 | -67.6 | -44.8 |

| SECOND | xa | ya | za | xb | yb | zb |
|---|---|---|---|---|---|---|
| 0 | 26.9 | 16.3 | -41.9 | 62.7 | 122.8 | 31.1 |
| 1 | 34.1 | 20.7 | -38.7 | 66.4 | 115.0 | 28.2 |
| 2 | 47.7 | 21.0 | -34.7 | 66.4 | 113.3 | 26.4 |
| 3 | 44.9 | 20.5 | -36.0 | 63.2 | 116.0 | 24.4 |
| 4 | 31.5 | 17.1 | -41.5 | 50.4 | 126.7 | 24.2 |
| 5 | 42.2 | 18.5 | -39.4 | 64.6 | 111.9 | 23.7 |
| 6 | 25.5 | 10.4 | -41.4 | 66.4 | 121.0 | 25.5 |
| 7 | 229.9 | 134.8 | -275.9 | 12.4 | 150.4 | 209.7 |
| 8 | 121.0 | 165.3 | -365.1 | 18.5 | 125.9 | 158.9 |
| 9 | 165.1 | 149.9 | -394.7 | 41.0 | 104.2 | 56.9 |
| 10 | 186.9 | 166.6 | -433.7 | 34.9 | 117.4 | 41.9 |
| 11 | 205.8 | 161.3 | -470.3 | 28.2 | 112.8 | 25.3 |
| 12 | 154.1 | 110.7 | -251.0 | 77.7 | 109.2 | 0.3 |
| 13 | 30.6 | 11.6 | -38.2 | 62.2 | 126.6 | 33.7 |
| 14 | 41.6 | 26.5 | -25.7 | 62.5 | 113.8 | 27.4 |
| 15 | 36.2 | 21.0 | -28.6 | 56.8 | 113.5 | 26.6 |
| 16 | 42.4 | 22.7 | -28.7 | 63.6 | 113.7 | 27.2 |
| 17 | 29.6 | 17.9 | -34.8 | 61.1 | 113.5 | 28.5 |

| SECOND | $x_i$ | $y_i$ | $z_i$ |
|---|---|---|---|
| 0 | 63.3 | 98.4 | -51.6 |
| 1 | 71.1 | 96.0 | -47.3 |
| 2 | 80.6 | 95.0 | -43.2 |
| 3 | 76.5 | 96.6 | -42.7 |
| 4 | 57.9 | 101.7 | -46.5 |
| 5 | 75.5 | 92.3 | -44.6 |
| 6 | 64.9 | 92.9 | -47.3 |
| 7 | 171.3 | 201.7 | -343.4 |
| 8 | 98.6 | 205.9 | -370.5 |
| 9 | 145.7 | 179.7 | -319.3 |
| 10 | 156.8 | 200.8 | -336.3 |
| 11 | 165.5 | 193.8 | -350.5 |
| 12 | 163.9 | 155.5 | -177.7 |
| 13 | 65.6 | 97.7 | -50.8 |
| 14 | 73.6 | 99.2 | -37.6 |
| 15 | 65.8 | 95.1 | -39.0 |
| 16 | 75.0 | 96.5 | -39.5 |
| 17 | 64.1 | 92.9 | -44.8 |

LEFTWARD VIDEO DATA, KNOWN METHOD
(ABSCISSA AXIS: SECOND, ORDINATE AXIS: PIXEL)

1800

$---xi$    $-----yi$    $- \cdot -zi$

RIGHTWARD VIDEO DATA, KNOWN METHOD
(ABSCISSA AXIS: SECOND, ORDINATE AXIS: PIXEL)

1810

$---xi$    $-----yi$    $- \cdot -zi$

| DATA TYPE | LEFTWARD VIDEO DATA | | | | | | | | | | | | | | | | | | |
|---|---|---|---|---|---|---|---|---|---|---|---|---|---|---|---|---|---|---|
| TIME | 0 | 1 | 2 | 3 | 4 | 5 | 6 | 7 | 8 | 9 | 10 | 11 | 12 | 13 | 14 | 15 | 16 | 17 |
| ACTION PERFORMED | 0 | 0 | 0 | 0 | 0 | 0 | 0 | 0 | 0 | 1 | 1 | 1 | 0 | 0 | 0 | 0 | 0 | 0 |

1910

| DATA TYPE | RIGHTWARD VIDEO DATA | | | | | | | | | | | | | | | | | | |
|---|---|---|---|---|---|---|---|---|---|---|---|---|---|---|---|---|---|---|
| TIME | 18 | 19 | 20 | 21 | 22 | 23 | 24 | 25 | 26 | 27 | 28 | 29 | 30 | 31 | 32 | 33 | 34 | 35 |
| ACTION PERFORMED | 0 | 0 | 0 | 0 | 0 | 0 | 0 | 0 | 0 | 1 | 1 | 1 | 0 | 0 | 0 | 0 | 0 | 0 |

FIG. 20

METHOD IMPLEMENTED BY INFORMATION
PROCESSING DEVICE 100

2000

| DATA TYPE | LEFTWARD VIDEO DATA | | | | | | RIGHTWARD VIDEO DATA | | | | | |
|---|---|---|---|---|---|---|---|---|---|---|---|---|
| TIME | 1 | 4 | 7 | 10 | 13 | 16 | 19 | 22 | 25 | 28 | 31 | 34 |
| CORRECT ANSWER | 0 | 0 | 0 | 1 | 0 | 0 | 0 | 0 | 0 | 1 | 0 | 0 |
| ESTIMATION RESULT | 0 | 0 | 0 | 1 | 0 | 0 | 0 | 0 | 0 | 1 | 0 | 0 |

KNOWN METHOD

2010

| DATA TYPE | LEFTWARD VIDEO DATA | | | | | | RIGHTWARD VIDEO DATA | | | | | |
|---|---|---|---|---|---|---|---|---|---|---|---|---|
| TIME | 1 | 4 | 7 | 10 | 13 | 16 | 19 | 22 | 25 | 28 | 31 | 34 |
| CORRECT ANSWER | 0 | 0 | 0 | 1 | 0 | 0 | 0 | 0 | 0 | 1 | 0 | 0 |
| ESTIMATION RESULT | 0 | 0 | 1 | 1 | 0 | 0 | 0 | 0 | 1 | 1 | 0 | 0 |

COMPUTER-READABLE RECORDING MEDIUM STORING INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2022-190856, filed on Nov. 29, 2022, the entire contents of which are incorporated herein by reference.

FIELD

The embodiment discussed herein is related to an information processing program, an information processing method, and an information processing device.

BACKGROUND

There is an existing technique for detecting skeletal information about a person in each frame of a video image by analyzing the video image in which the person appears. There also is a technique for training and using a machine learning model that recognizes an action of a person in accordance with input skeletal information about the person. As the relate art, for example, there is a technique for transforming the coordinates corresponding to the respective body parts in a plurality of body parts into coordinates that are line-symmetrical with respect to a reference axis formed by connecting the coordinates corresponding to a plurality of predetermined reference parts, among the coordinates corresponding to the respective body parts in the plurality of body parts. Also, for example, there is a technique for determining the presence/absence of a symmetrical linear graphic, based on the pixels in a region corresponding to the periphery of a pair of a vertical line and an oblique line, and the pixels in a region outside the periphery in an input image.

Examples of the related art include: Japanese Laid-open Patent Publication No. 2022-6919; and Japanese Laid-open Patent Publication No. 2011-65434.

SUMMARY

According to an aspect of the embodiments, there is provided a non-transitory computer-readable recording medium storing an information processing program for causing a computer to execute processing including: acquiring a video image in which a first person appears; identifying positional information about each of two body parts that form a pair among body parts of the first person in the video image, by analyzing the acquired video image; generating a first component that indicates a sum of the identified positional information about each body part; generating a third component that indicates an absolute value of a second component that indicates a difference in the identified positional information about each body part; and training a model that outputs posture information about a second person from a video image in which the second person appears, based on the generated first component and the generated third component.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram illustrating an example hardware configuration of a video imaging device 201;

FIG. 5 is a block diagram illustrating an example functional configuration of the information processing device 100;

FIG. 15 is a table for explaining and illustrating an example of numerical values indicating effects of the information processing device 100 (part 5);

FIG. 17 is a table for explaining and illustrating an example of numerical values indicating effects of the information processing device 100 (part 7);

FIG. 19 is tables for explaining and illustrating an example of numerical values indicating effects of the information processing device 100 (part 9);

FIG. 20 is tables for explaining and illustrating an example of numerical values indicating effects of the information processing device 100 (part 10);

DESCRIPTION OF EMBODIMENTS

In the related art, however, there are cases where it is difficult to accurately recognize a specific action of a person, using a machine learning model. For example, it is difficult to train a machine learning model that accurately recognizes an action of "holding an object with the right hand" and an action of "holding an object with the left hand" as the same actions of "holding an object with one hand".

In one aspect, an embodiment aims to facilitate training of a model that accurately recognizes a specific action.

In the description below, an embodiment of an information processing program, an information processing method, and an information processing device is explained in detail with reference to the drawings.

One Example of an Information Processing Method According to an Embodiment

Figure 1:
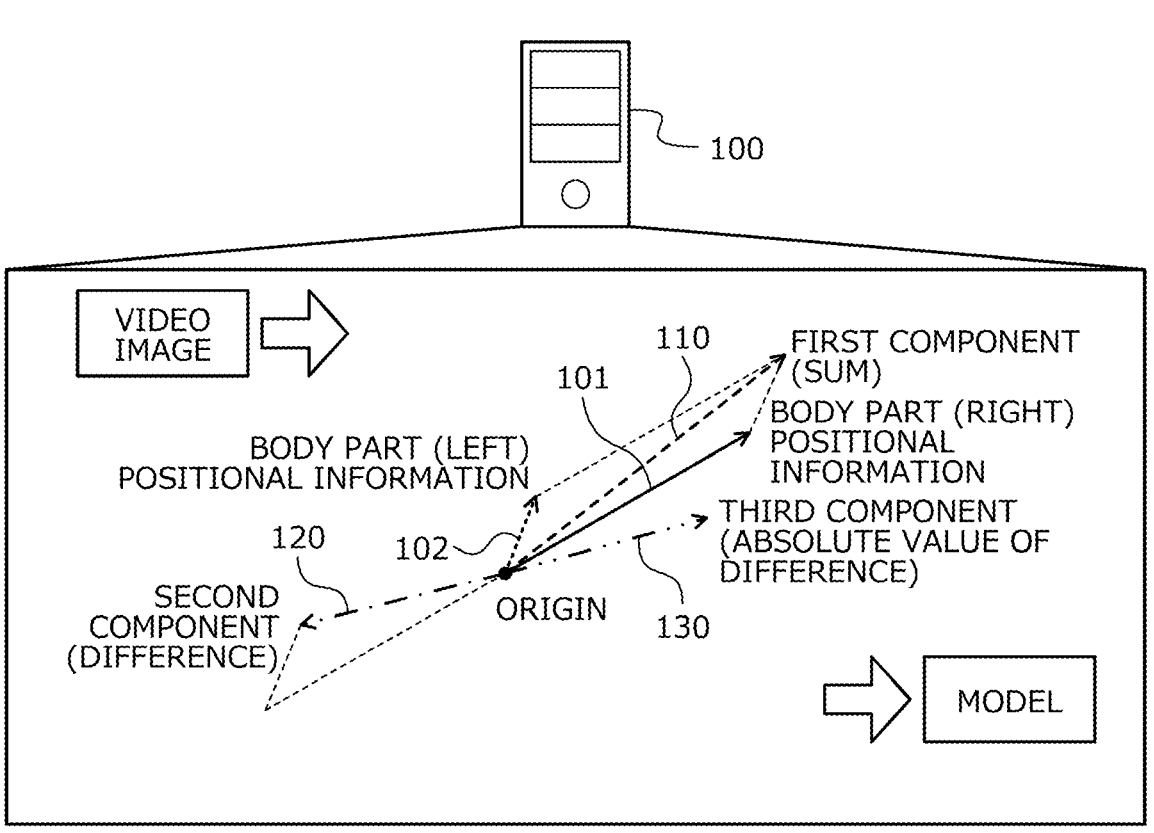
FIG. 1 is an explanatory diagram illustrating an example of an information processing method according to an embodiment.

FIG. 1 is an explanatory diagram illustrating an example of an information processing method according to an embodiment. An information processing device 100 is a computer that trains a model. The information processing device 100 is a server, a personal computer (PC), or the like, for example.

A model is, for example, a machine learning model that recognizes actions of a person in accordance with input skeletal information about the person. The skeletal information includes, for example, coordinate values indicating the positions of the respective skeletal parts of a plurality of skeletal parts of the person. The positions of the skeletal parts are the positions of the neck, the head, the right shoulder, the left shoulder, the right elbow, the left elbow, the right hand, the left hand, the right knee, the left knee, the right foot, the left foot, and the like, for example.

For example, it is conceivable that a model may be used to recognize actions of a person who is a customer and perform marketing, recognize actions of a person in need of care and detect a fall and the like of the person, or recognize actions of a person being captured by a surveillance camera and spot a suspicious person. Therefore, there is a demand for training of a model that can accurately recognize actions of a person in accordance with the input skeletal information about the person.

However, with known techniques, there are cases where it is difficult to train a model that can accurately recognize actions of a person in accordance with the input skeletal information about the person. Because of this, even if a trained model is used, it might be difficult to accurately recognize a specific action of a person.

For example, in recognizing actions of a person, there are cases where it is preferable to recognize actions of the same type related to the two respective body parts that form a pair of left and right body parts, as the same actions. Specifically, there are cases where it is preferable to recognize an action of "holding an object with the right hand" and an action of "holding an object with the left hand" as the same actions of "holding an object with one hand".

With a known technique, it is difficult to train a model capable of accurately recognizing actions of the same type related to the two respective body parts forming a pair of left and right body parts, as the same actions. Specifically, it is difficult to train a model that is capable of accurately recognizing an action of "holding an object with the right hand" and an action of "holding an object with the left hand" as the same actions of "holding an object with one hand".

On the other hand, for example, there is a conceivable method for training a model, based on training data in which labels indicating the same action are associated with two pieces of skeletal information corresponding to a case where actions of the same type are performed by body parts that are different from each other and are the two body parts forming a pair of left and right body parts. Specifically, it is conceivable to prepare first training data in which a label indicating an action of "holding an object with one hand" is associated with first skeletal information about a time when a first action of "holding an object with the right hand" is performed. Specifically, it is conceivable to prepare second training data in which the label indicating an action of "holding an object with one hand" is associated with second skeletal information about a time when a second action of "holding an object with the left hand" is performed. Specifically, it is conceivable that a model may be trained based on the prepared first training data and second training data.

In this method, two sets of training data are handled as training data including a label indicating the same actions, though the features in the skeletal information included in the respective pieces of training data are different. For this reason, there is a problem in that fluctuation of training data tends to be large, and it is difficult to train a model capable of accurately recognizing actions of the same type related to the two respective body parts forming a pair of left and right body parts, as the same actions.

Also, for example, there is a conceivable method for training two models corresponding to a case where actions of the same type are performed by body parts that are different from each other and are the two body parts forming a pair of left and right body parts. Specifically, it is conceivable to train a first model capable of recognizing a first action of "holding an object with the right hand" and a second model capable of recognizing a second action of "holding an object with the left hand". Specifically, it is conceivable that cases where either of the first action and the second action is recognized may also be regarded as recognition of the same actions of "holding an object with one hand".

In this method, two models are trained to accurately recognize an action of "holding an object with one hand", and this leads to a problem of an increase in the amount of training data to be prepared, and a problem of increases in the processing load and the processing time at the time of training. Further, this leads to increases in the processing load and the processing time for accuracy verification or maintenance of the two trained models. This leads to increases in the development costs and the operational costs for enabling recognition of an action of "holding an object with one hand".

Furthermore, for example, there is a conceivable method for training a model after the respective pieces of skeletal information about two pieces of skeletal information corresponding to a case where actions of the same type are performed by different respective body parts that are the two body parts forming a pair of left and right body parts are processed and are handled as the same skeletal information.

Specifically, it is conceivable that the coordinate value having the greater absolute value between the coordinate value indicating the position of the right hand and the coordinate value indicating the position of the left hand may be set as the coordinate value indicating the position of a hand. Specifically, it is conceivable that a model may be trained after the skeletal information about each of the two pieces of skeletal information is processed so that a combination of the coordinate value indicating the position of the right hand and the coordinate value indicating the position of the left hand is replaced with the coordinate value indicating the position of a hand.

In this method, the coordinate value having the smaller absolute value between the coordinate value indicating the position of the right hand and the coordinate value indicating the position of the left hand is not reflected in the model. Because of this, there is a problem in that it is difficult to train a model capable of accurately recognizing actions of the same type related to the two respective body parts forming a pair of left and right body parts, as the same actions.

Specifically, between the coordinate value indicating the position of the right hand and the coordinate value indicating the position of the left hand, it is conceivable that the coordinate value at the longer distance from the center of the body may be set as the coordinate value indicating the position of a first hand, and the coordinate value at the shorter distance from the center of the body may be set as the coordinate value indicating the position of a second hand. Specifically, it is conceivable that the skeletal information may be processed so that the coordinate value indicating the position of the right hand and the coordinate value indicating the position of the left hand are replaced with the coordinate value indicating the position of the first hand at the longer distance from the center of the body and the coordinate value indicating the position of the second hand at the shorter distance from the center of the body. Specifically, it is conceivable that a model may be trained based on the respective processed pieces of the skeletal information.

In this method, in a case where a plurality of pieces of skeletal information in chronological order is processed, and a model is then trained based on the plurality of processed pieces of skeletal information, the model might not be appropriately trained. Specifically, there are cases where the magnitude relationship between the distance from the center of the body to the coordinate value indicating the position of the right hand and the distance from the center of the body to the coordinate value indicating the position of the left hand is switched in the middle of chronological order. For this reason, between the right hand and the left hand, the hand regarded as the first hand and the hand regarded as the second hand may be switched in the middle of chronological order. Then, the plurality of the processed pieces of skeletal information might indicate a physically unnatural action as a motion of a person, such as an instantaneous appearance of one hand of the person at another place without continuous movement. Therefore, there is a problem in that it is difficult to train a model capable of accurately recognizing actions of the same type related to the two respective body parts forming a pair of left and right body parts, as the same actions.

In view of the above, in this embodiment, an information processing method for easily training a machine learning model that accurately recognizes a specific action is described.

In FIG. 1, the information processing device 100 identifies positional information about each of the two body parts that form a pair of body parts among the body parts of a first person in a video image in which the first person appears. The video image includes one or more frames, for example. The body parts are the neck, the head, the right shoulder, the left shoulder, the right elbow, the left elbow, the right hand, the left hand, the right knee, the left knee, the right foot, the left foot, and the like, for example.

The two body parts that form a pair are a combination of the right hand and the left hand, for example. The positional information indicates, for example, a combination of a plurality of component values in axial directions different from each other, the component values indicating the positions of body parts in a three-dimensional space. The axes are called the X-axis, the Y-axis, and the Z-axis, for example. The positions of the body parts in the three-dimensional space are the positions of the skeletal parts indicating the body parts in the three-dimensional space, for example. The positional information may be vectors, for example.

The positional information may indicate, for example, a combination of a plurality of component values in axial directions different from each other, the component values indicating the positions of body parts in a two-dimensional space. The axes are called the X-axis and the Y-axis, for example. The two-dimensional space may correspond to, for example, a frame, a region having a prescribed size in which a person in the frame appears, or the like. The positions of the body parts in the two-dimensional space are the positions of the skeletal parts indicating the body parts in the two-dimensional space, for example. The positional information may be vectors, for example. The positional information may be polar coordinates, for example.

The information processing device 100 identifies, for example, positional information about each of the two body parts that form a pair of body parts among the body parts of the first person in each frame of the video image in which the first person appears. Specifically, the information processing device 100 acquires the video image in which the first person appears. Then, the information processing device 100 analyzes the acquired video image, specifically, to identify the positional information by generating the positional information about each of the two body parts that form a pair of left and right body parts among the body parts of the first person in each frame of the video image.

The information processing device 100 generates a first component 110 indicating the sum of the identified positional information about each of the two body parts that form a pair of left and right body parts. The information processing device 100 generates, for example, the first component 110 indicating the sum of a vector 101 indicated by the positional information about the body part of the right hand and a vector 102 indicated by the positional information about the body part of the left hand. The first component 110 is a vector, for example.

Specifically, the information processing device 100 generates the first component 110 indicating the sum of the vector 101 indicated by the positional information about the body part of the right hand and the vector 102 indicated by the positional information about the body part of the left hand in each frame of the video image in which the first person appears. As a result, the information processing device 100 can obtain the first component 110 that indicates a feature related to the commonality in positional information between the two respective body parts that form a pair of left and right body parts, and may serve as a guideline at the time of training of a model.

(1-2) The information processing device 100 generates a third component 130 indicating the absolute value of a second component 120 indicating the difference in the identified positional information about each of the two body parts that form a pair of left and right body parts. The information processing device 100 generates, for example, the third component 130 indicating the absolute value of the second component 120 indicating the difference between the vector 101 indicated by the positional information about the body part of the right hand and the vector 102 indicated by the positional information about the body part of the left hand. The second component 120 is a vector, for example.

The third component 130 is, for example, a vector in a prescribed direction having the absolute value of the second component 120 as its magnitude. The prescribed direction is determined by the direction of the second component 120, in accordance with a predetermined rule, for example. The predetermined rule is a rule for determining the direction of the third component to be either the same direction as the direction of the second component or the direction opposite to the direction of the second component. The predetermined rule is a rule for determining the direction of the third component to be the same direction as the direction of the second component or the direction opposite to the direction of the second component, whichever is a direction in which the directional component in one of the axial directions is positive.

Specifically, the information processing device 100 generates the third component 130 indicating the absolute value of the second component 120 indicating the difference between the vector 101 indicated by the positional information about the body part of the right hand and the vector 102 indicated by the positional information about the body part of the left hand in each frame of the video image in which the first person appears. As a result, the information processing device 100 can obtain the third component 130 that indicates a feature related to the difference in positional information between the respective body parts, and may serve as a guideline at the time of training of a model. Furthermore, the information processing device 100 can generate the third component 130 that has its direction adjusted so that the third component 130 to be generated matches even if the movement of each of the two body parts that form a pair of left and right body parts is reversed.

(1-3) The information processing device 100 trains a model, based on the generated first component 110 and the generated third component 130. A second person may be the same person as the first person, for example. The second person may be a different person from the first person, for example.

A model has a function of outputting posture information about the second person from a video image in which the second person appears. The model has a function of outputting the posture information about the second person, in response to an input of an explanatory variable including positional information about each of the two body parts that form a pair of body parts among the body parts of the second person in the video image in which the second person appears, for example.

The model is a neural network, for example. The model may be a mathematical expression, for example. The model may be a tree structure, for example. The posture information is information indicating whether the posture of the second person is a specific posture, for example. The posture information may be information indicating whether the posture of the second person is a posture corresponding to a specific action, for example. The posture information may be information indicating whether the second person has performed a specific action, for example.

The information processing device 100 trains a model, based on the generated first component 110 and the generated third component 130 in each frame of the video image in which the first person appears, for example. Specifically, the information processing device 100 acquires a label indicating a correct action of the first person in each frame of the video image in which the first person appears.

Specifically, for each frame of the video image in which the first person appears, the information processing device 100 generates training data in which an input sample including the first component 110 and the third component 130 in the frame is associated with a label indicating a correct action of the first person.

Specifically, using logistic regression, the information processing device 100 trains a model, based on the generated training data. Specifically, using a technique other than logistic regression, the information processing device 100 may train a model, based on the generated training data. Specifically, using error back-propagation, the information processing device 100 may train a model, based on the generated training data.

In this manner, the information processing device 100 can train a model that has a function of outputting posture information about the second person from a video image in which the second person appears. The information processing device 100 can transform, for example, the positional information about the two respective body parts that form a pair of left and right body parts into a combination of the first component 110 and the third component 130 with predetermined properties.

The predetermined properties include, for example, properties with which the combination of the first component 110 and the third component 130 remains the same even if the movement of each of the two body parts that form a pair of left and right body parts is reversed. The predetermined properties include, for example, properties with which the feature of the movement of each of the two body parts that form a pair of left and right body parts is reflected in the combination of the first component 110 and the third component 130. The predetermined properties include, for example, properties with which the first component 110 continuously changes in chronological order, and the third component 130 continuously changes along with the time series.

Thus, using the combination of the first component 110 and the third component 130, the information processing device 100 can train a model that is capable of accurately estimating the posture information about the second person from the video image in which the second person appears. Using the trained model, the information processing device 100 can recognize actions of the same type related to the two respective body parts forming a pair of left and right body parts as the same actions.

Since the information processing device 100 only needs to train a single model, it is possible to reduce the increase in the amount of training data to be prepared, and reduce the increases in the processing load and the processing time at the time of training. The information processing device 100 can reduce the increases in the processing load and the processing time for accuracy verification or maintenance of a trained model. The information processing device 100 can reduce the increases in the development costs and the operational costs for enabling recognition of a specific action.

(1-4) The information processing device 100 may acquire a video image in which the second person appears, and acquire posture information about the second person, using a trained model. The information processing device 100 analyzes, for example, the acquired video image in which the second person appears, to identify the positional information about each of the two body parts that form a pair of left and right body parts among the body parts of the second person in each frame of the video image in which the second person appears.

The information processing device 100 generates, for example, a fourth component indicating the sum of the identified positional information about the two respective body parts that form a pair of left and right body parts in each frame of the video image in which the second person appears. The information processing device 100 generates, for example, a sixth component indicating the absolute value of a fifth component indicating the difference in the identified positional information between the two respective body parts that form a pair of left and right body parts in each frame of the video image in which the second person appears.

For example, based on the generated fourth component and the generated sixth component, the information processing device 100 acquires posture information indicating whether the posture of the second person is a posture corresponding to a specific action, using a trained model. By doing so, the information processing device 100 can accurately generate posture information. The information processing device 100 can make the posture information available.

Although a case where the information processing device 100 operates independently has been described herein, the embodiment is not limited to this. For example, there may be a case where the information processing device 100 cooperates with another computer. For example, there may be a case where a plurality of computers cooperates to form a function as the information processing device 100. Specifically, there may be a case where a function as the information processing device 100 is formed in a cloud.

Although a case where the information processing device 100 analyzes a video image in which the first person appears has been described herein, the embodiment is not limited to this. For example, there may be a case where the information processing device 100 is able to communicate with another computer that analyzes the video image in which the first person appears. In this case, the information processing device 100 receives, from the another computer, the positional information about each of the two body parts that form a pair of body parts among the body parts of the first person in the video image in which the first person appears, and thus, identifies the positional information.

Although a case where the information processing device 100 trains a model based on the generated first component and the generated third component has been described herein, the embodiment is not limited to this. For example, there may be a case where the information processing device 100 transmits the generated first component and the generated third component to another computer. In this case, the another computer trains a model, based on the received first component and the received third component.

Although a case where the information processing device 100 acquires the posture information about the second person with the use of a trained model has been described herein, the embodiment is not limited to this. For example, there may be a case where the information processing device 100 transmits the trained model to another computer. In this case, the another computer acquires a video image in which the second person appears, and acquires the posture information about the second person, using the received model.

Example of an Information Processing System 200

Next, an example of an information processing system 200 to which the information processing device 100 illustrated in FIG. 1 is applied is described with reference to FIG. 2.

Figure 2:
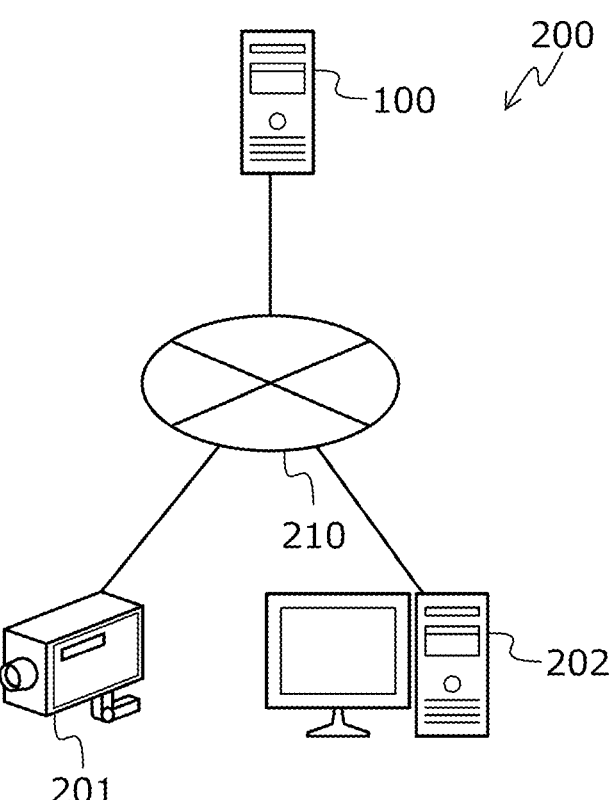
FIG. 2 is an explanatory diagram illustrating an example of an information processing system 200.

FIG. 2 is an explanatory diagram illustrating an example of the information processing system 200. In FIG. 2, the information processing system 200 includes the information processing device 100, one or more video imaging devices 201, and one or more client devices 202.

In the information processing system 200, the information processing device 100 and the video imaging devices 201 are coupled via a wired or wireless network 210. The network 210 is a local area network (LAN), a wide area network (WAN), the Internet, or the like, for example. Further, in the information processing system 200, the information processing device 100 and the client devices 202 are coupled via the wired or wireless network 210.

The information processing device 100 is a computer that trains a model. The information processing device 100 stores a first machine learning model, for example. The first machine learning model has a function of outputting positional information about the body parts of a person appearing in a video image, in accordance with an input of the video image, for example. The body parts are the neck, the head, the right shoulder, the left shoulder, the right elbow, the left elbow, the right hand, the left hand, the right knee, the left knee, the right foot, the left foot, and the like, for example. The positional information indicates the positions of the body parts in a three-dimensional space. The positional information indicates, for example, a combination of a plurality of component values in axial directions different from each other, the component values indicating the positions of body parts in the three-dimensional space. The positions are the positions of skeletal parts indicating the body parts in the three-dimensional space, for example.

The positional information may indicate the positions of the body parts in a two-dimensional space, for example. The positional information may indicate, for example, a combination of a plurality of component values in axial directions different from each other, the component values indicating the positions of body parts in the two-dimensional space. The positions are the positions of skeletal parts indicating the body parts in the two-dimensional space, for example. The positional information may be vectors, for example. The positional information may be polar coordinates, for example.

Specifically, the first machine learning model has a function of outputting the positional information about the body parts of a person appearing in the subject frame, in response to an input of each frame of a video image. The first machine learning model is an artificial intelligence (AI) model or the like, for example. The first machine learning model may be formed with a neural network, a mathematical expression, a tree structure, or the like, for example.

The information processing device 100 acquires a video image in which a first person appears, for example. There may be a plurality of persons who can be the first person. The information processing device 100 may acquire a video image in which each person of a plurality of persons who can be the first person appears, for example. Specifically, the information processing device 100 acquires the video image in which the first person appears, by receiving the video image from a video imaging device 201.

The information processing device 100 analyzes, for example, the acquired video image in which the first person appears, to identify the positional information about each of the two body parts that form a pair of left and right body parts among the body parts of the first person in each frame of the video image in which the first person appears. Specifically, using the first machine learning model, the information processing device 100 identifies the positional information about each of the two body parts that form a pair of left and right body parts among the body parts of the first person in each frame of the video image, based on the video image in which the first person appears.

The information processing device 100 generates, for example, a first component indicating the sum of the identified positional information about the two respective body parts that form a pair of left and right body parts in each frame of the video image in which the first person appears. The information processing device 100 generates, for example, a third component indicating the absolute value of a second component indicating the difference in the identified positional information between the two respective body parts that form a pair of left and right body parts in each frame of the video image in which the first person appears. The information processing device 100 trains a model, based on the generated first component and the generated third component in each frame of the video image in which the first person appears, for example.

The information processing device 100 acquires a video image in which a second person appears, for example. The second person is the target person who is subjected to determination as to whether to have performed a specific action, for example. Specifically, the information processing device 100 acquires the video image in which the second person appears, by receiving the video image from a video imaging device 201.

The information processing device 100 analyzes, for example, the acquired video image in which the second person appears, to identify the positional information about each of the two body parts that form a pair of left and right body parts among the body parts of the second person in each frame of the video image in which the second person appears. Specifically, using the first machine learning model, the information processing device 100 identifies the positional information about each of the two body parts that form a pair of left and right body parts among the body parts of the second person in each frame of the video image, based on the video image in which the second person appears.

The information processing device 100 generates, for example, a fourth component indicating the sum of the identified positional information about the two respective body parts that form a pair of left and right body parts in each frame of the video image in which the second person appears. The information processing device 100 generates, for example, a sixth component indicating the absolute value of a fifth component indicating the difference in the identified positional information between the two respective body parts that form a pair of left and right body parts in each frame of the video image in which the second person appears. For example, based on the generated fourth component and the generated sixth component in each frame of the video image in which the second person appears, the information processing device 100 acquires posture information indicating whether the posture of the second person is a posture corresponding to a specific action, using a trained model.

The information processing device 100 outputs the acquired posture information, for example. The output format is display on a display, print output to a printer, transmission to another computer, storage into a storage area, or the like, for example. Specifically, the information processing device 100 transmits the acquired posture information to a client device 202. The information processing device 100 is managed by an administrator who manages the information processing system 200, for example. The information processing device 100 is a server, a personal computer (PC), or the like, for example.

A video imaging device 201 is a computer for imaging a specific region and generating a video image in which a person appears. The video imaging device 201 includes a camera having a plurality of imaging elements, for example, and images a specific region where a person may exist with the camera. The video imaging device 201 generates a video image in which a specific person appears, for example, and transmits the video image to the information processing device 100.

Specifically, the video imaging device 201 generates a video image in which the first person appears, and transmits the video image to the information processing device 100. Specifically, the video imaging device 201 generates a video image in which the second person appears, and transmits the video image to the information processing device 100. The video imaging device 201 is a smartphone or the like, for example. The video imaging device 201 may be a fixed-point camera or the like, for example. The video imaging device 201 may be a drone or the like, for example.

A client device 202 is a computer that is used by an operator who is to refer to the posture information about the second person. The client device 202 receives, for example, the posture information about the second person from the information processing device 100. The client device 202 outputs the received posture information about the second person so that the operator can refer to the posture information. The output format is display on a display, print output to a printer, transmission to another computer, storage into a storage area, or the like, for example. The client device 202 is a PC, a tablet terminal, a smartphone, or the like, for example.

Although a case where the information processing device 100 is a different device from the video imaging devices 201 has been described herein, the embodiment is not limited to this. For example, there may be a case where the information processing device 100 has the functions of a video imaging device 201, and also operates as a video imaging device 201. Although a case where the information processing device 100 is a different device from the client devices 202 has been described herein, the embodiment is not limited to this. For example, there may be a case where the information processing device 100 has the functions of a client device 202, and also operates as a client device 202.

Example Applications of the Information Processing System 200

Next, example applications of the information processing system 200 are described. For example, it is conceivable that the information processing system 200 may be applied in the case of determining whether the target person appearing in a video image captured by a surveillance camera has performed a specific action corresponding to a suspicious action, a prohibited action, a criminal action, or the like. It is conceivable that the specific action may be a violent action such as beating a person with one hand, a prohibited action such as touching an exhibit with one hand, or the like, for example. The exhibit is an animal, a plant, an art piece, or the like, for example. In this case, the video imaging device 201 is a surveillance camera, for example. The operator is a security guard, a police officer, or the like, for example. In this case, the information processing system 200 can accurately determine whether the target person has performed a specific action corresponding to a suspicious action, a prohibited action, a criminal action, or the like. Accordingly, the information processing system 200 can facilitate prevention of specific actions corresponding to suspicious actions, prohibited actions, criminal actions, and the like.

Also, it is conceivable that the information processing system 200 may be applied in the case of determining whether the target person appearing in a video image captured by a fixed-point camera provided in a nursing care facility or the like has performed a specific action, and supporting the work of a caregiver working in the nursing care facility, for example. It is conceivable that the specific action may be actions such as walking while dragging one leg, falling down with one hand on the floor, or the like, for example. In this case, the target person is a person who needs nursing care and stays in a nursing care facility or the like, for example. The video imaging device 201 is the fixed-point camera, for example. The operator is a caregiver, for example. In this case, the information processing system 200 can accurately determine whether the target person has performed a specific action, and the operator can easily ensure the safety of the target person.

Further, it is conceivable that the information processing system 200 may be applied in the case of determining whether the target person appearing in a video image captured by a fixed-point camera provided in a store such as a grocery store has performed a specific action, and conducting marketing, for example. It is conceivable that the specific action may be an action such as taking a product with one hand, for example. In this case, the target person is a customer who has visited the store, for example. The video imaging device 201 is the fixed-point camera, for example. The operator is an expert who conducts the marketing, for example. In this case, the information processing system 200 can accurately determine whether the target person has performed a specific action, and the operator can easily conduct accurate marketing.

Also, it is conceivable that the information processing system 200 may be applied in the case of providing the target person with content, depending on whether the target person who has visited an entertainment facility and appears in a video image captured by a fixed-point camera provided in the entertainment facility or the like has performed a specific action, for example. It is conceivable that the specific action may be an action of moving one hand in a specific pattern, for example. The content may be a video for entertainment, mechanical equipment in a facility, music, or the like, for example. In this case, the target person is a child, for example. The video imaging device 201 is the fixed-point camera, for example. In this case, the information processing system 200 can accurately determine whether the target person has performed a specific action, and the operator can easily provide content in an appropriate manner.

Example Hardware Configuration of the Information Processing Device 100)

Next, an example hardware configuration of the information processing device 100 is described with reference to FIG. 3.

Figure 3:
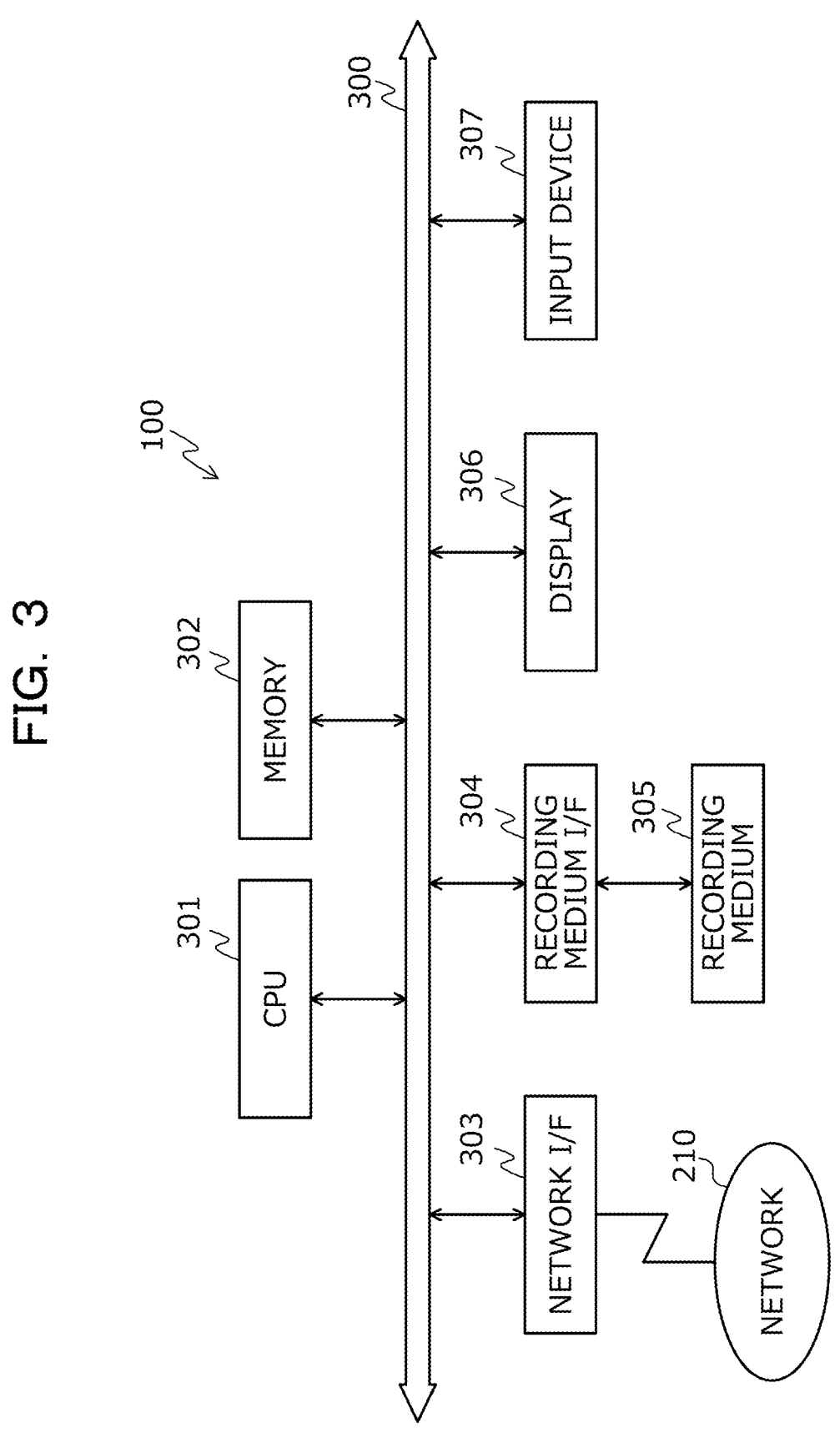
FIG. 3 is a block diagram illustrating an example hardware configuration of an information processing device 100.

FIG. 3 is a block diagram illustrating an example hardware configuration of the information processing device 100. In FIG. 3, the information processing device 100 includes a central processing unit (CPU) 301, a memory 302, and a network interface (I/F) 303. Also, the information processing device 100 includes a recording medium I/F 304, a recording medium 305, a display 306, and an input device 307. Furthermore, the respective components are coupled to each other by a bus 300.

Here, the CPU 301 takes control of the entire information processing device 100. The memory 302 includes a read only memory (ROM), a random access memory (RAM), a flash ROM, and the like, for example. Specifically, the flash ROM or the ROM stores various programs, and the RAM is used as a work area for the CPU 301, for example. The programs stored in the memory 302 are loaded into the CPU 301, to cause the CPU 301 to execute coded processes.

The network I/F 303 is coupled to the network 210 through a communication line, and is coupled to another computer via the network 210. Then, the network I/F 303 takes control of an interface between the network 210 and the inside, and controls inputs and outputs of data to and from the another computer. The network I/F 303 is a modem, a LAN adapter, or the like, for example.

The recording medium I/F 304 controls reading and writing of data from and into the recording medium 305, under the control of the CPU 301. The recording medium I/F 304 is a disk drive, a solid state drive (SSD), a universal serial bus (USB) port, or the like, for example. The recording medium 305 is a nonvolatile memory that stores data that is written under the control of the recording medium I/F 304. The recording medium 305 is a disk, a semiconductor memory, a USB memory, or the like, for example. The recording medium 305 may be attachable to and detachable from the information processing device 100.

The display 306 displays data such as a cursor, icons, a toolbox, a document, an image, or function information. The display 306 is a cathode ray tube (CRT), a liquid crystal display, an organic electroluminescence (EL) display, or the like, for example. The input device 307 has keys for inputting characters, numbers, various instructions, or the like, and inputs data. The input device 307 is a keyboard, a mouse, or the like, for example. The input device 307 may be a touch-panel input pad, a numeric keypad, or the like, for example.

The information processing device 100 may include a camera or the like, for example, in addition to the above components. The information processing device 100 may also include a printer, a scanner, a microphone, a speaker, or the like, for example, in addition to the above components. Also, the information processing device 100 may include a plurality of the recording medium I/Fs 304 and a plurality of the recording media 305, for example. Alternatively, the information processing device 100 may not include the display 306, the input device 307, or the like, for example. Furthermore, the information processing device 100 may not include the recording medium I/F 304 and the recording medium 305, for example.

Example Hardware Configuration of a Video Imaging Device 201

Next, an example hardware configuration of a video imaging device 201 is described with reference to FIG. 4.

Figure 4:
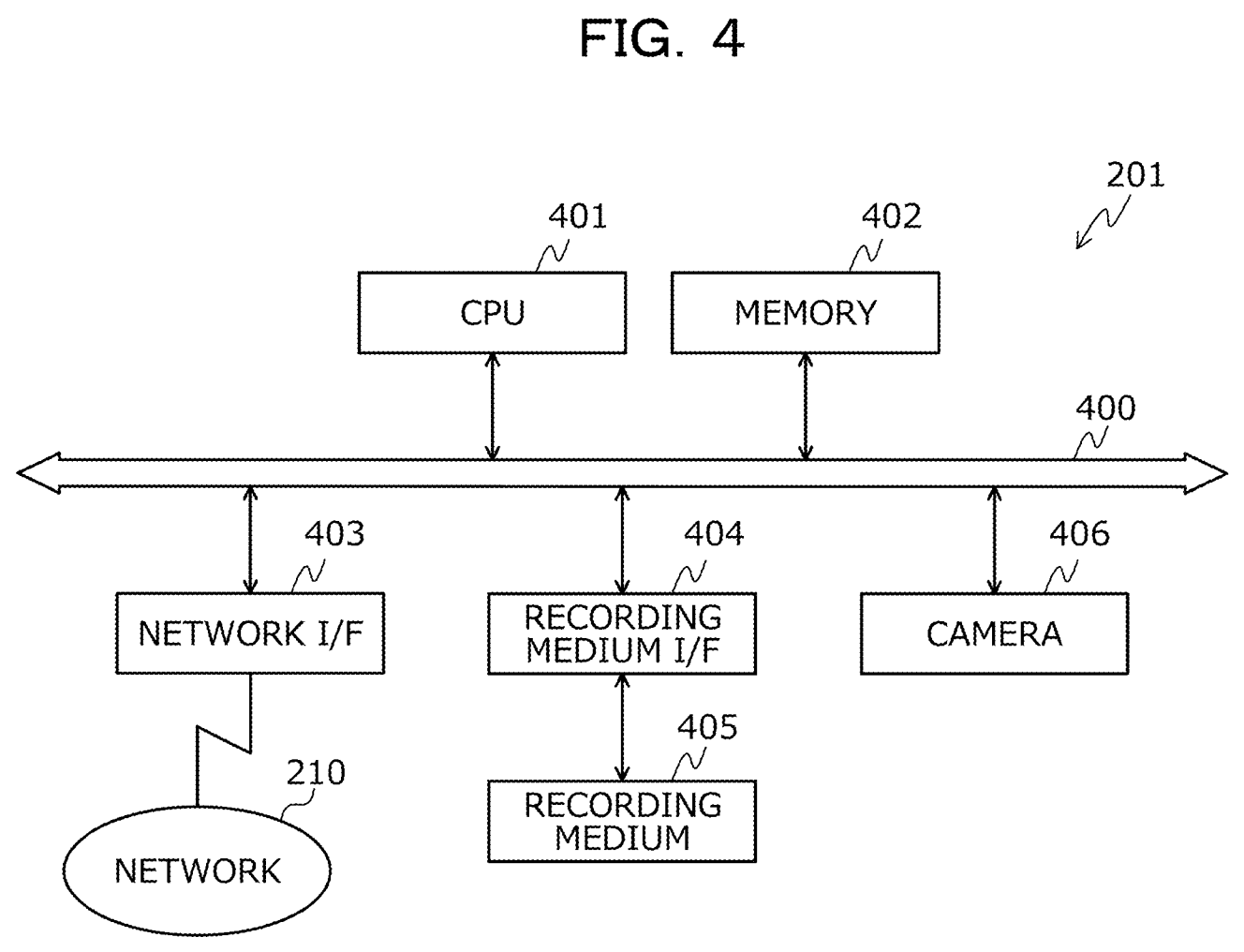
Figure 5:
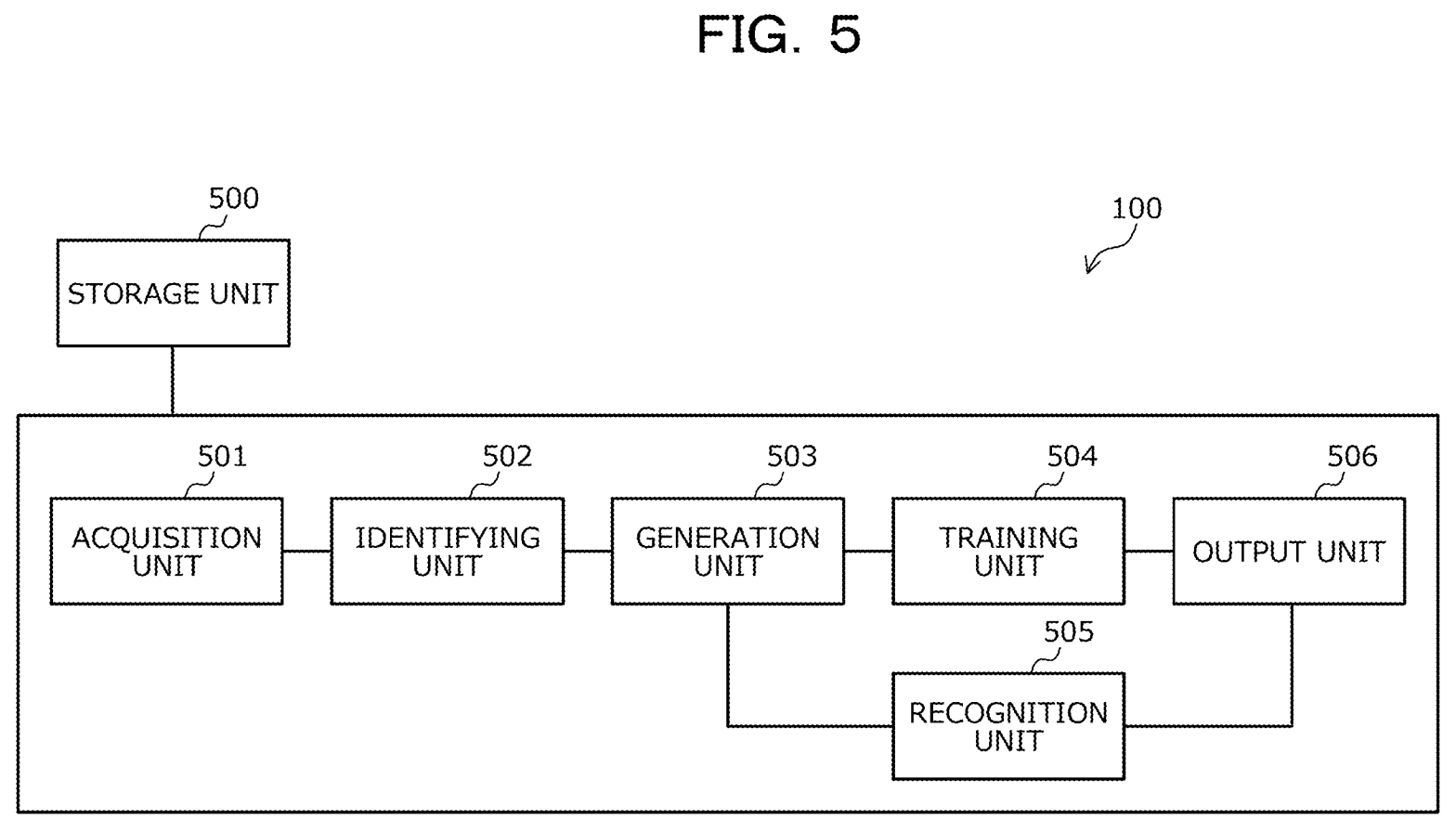

FIG. 4 is a block diagram illustrating an example hardware configuration of a video imaging device 201. In FIG. 5, the video imaging device 201 includes a CPU 401, a memory 402, a network I/F 403, a recording medium I/F 404, a recording medium 405, and a camera 406. Further, the respective components are coupled to each other by a bus 400.

Here, the CPU 401 takes control of the entire video imaging device 201. The memory 402 includes a ROM, a RAM, a flash ROM, and the like, for example. Specifically, the flash ROM or the ROM stores various programs, and the RAM is used as a work area for the CPU 401, for example. The programs stored in the memory 402 are loaded into the CPU 401, to cause the CPU 401 to execute coded processes.

The network I/F 403 is coupled to the network 210 through a communication line, and is coupled to another computer via the network 210. Then, the network I/F 403 takes control of an interface between the network 210 and the inside, and controls inputs and output of data to and from the another computer. The network I/F 403 is a modem, a LAN adapter, or the like, for example.

The recording medium I/F 404 controls reading and writing of data from and into the recording medium 405, under the control of the CPU 401. The recording medium I/F 404 is a disk drive, an SSD, a USB port, or the like, for example. The recording medium 405 is a nonvolatile memory that stores data that is written under the control of the recording medium I/F 404. The recording medium 405 is a disk, a semiconductor memory, a USB memory, or the like, for example. The recording medium 405 may be attachable to and detachable from the video imaging device 201.

The camera 406 includes a plurality of imaging elements, and generates a video image obtained by imaging a specific region with the plurality of imaging elements. For example, when a person exists in the specific region, the camera 406 generates a video image in which the person appears. The camera 406 is a digital camera, for example. The camera 406 is a fixed-point camera, for example. The camera 406 may be movable, for example. The camera 406 is a surveillance camera, for example.

The video imaging device 201 may include, in addition to the above components, a keyboard, a mouse, a display, a printer, a scanner, a microphone, a speaker, or the like, for example. Also, the video imaging device 201 may include a plurality of the recording medium I/Fs 404 and a plurality of the recording media 405. Alternatively, the video imaging device 201 may not include the recording medium I/F 404 and the recording medium 405.

Example Hardware Configuration of a Client Device 202

An example hardware configuration of a client device 202 is similar, to be specific, to the example hardware configuration of the information processing device 100 illustrated in FIG. 3, and therefore, explanation thereof is not made herein.

Example Functional Configuration of the Information Processing Device 100)

Next, an example functional configuration of the information processing device 100 is described with reference to FIG. 5.

FIG. 5 is a block diagram illustrating an example functional configuration of the information processing device 100. The information processing device 100 includes a storage unit 500, an acquisition unit 501, an identifying unit 502, a generation unit 503, a training unit 504, a recognition unit 505, and an output unit 506.

The storage unit 500 is formed with a storage area such as the memory 302 or the recording medium 305 illustrated in FIG. 3, for example. Although a case where the storage unit 500 is included in the information processing device 100 is explained in the description below, the embodiment is not limited to this. For example, there may be a case where the storage unit 500 is included in a device different from the information processing device 100, and the contents stored in the storage unit 500 may be referred to by the information processing device 100.

The acquisition unit 501 to the output unit 506 function as an example of a control unit. Specifically, the acquisition unit 501 to the output unit 506 achieve their functions by causing the CPU 301 to execute a program stored in a storage area such as the memory 302 or the recording medium 305 illustrated in FIG. 3, or through the network I/F 303, for example. A processing result of each functional unit is stored into, for example, a storage area such as the memory 302 or the recording medium 305 illustrated in FIG. 3.

The storage unit 500 stores various kinds of information to be referred to or to be updated in processes to be performed by the respective functional units. The storage unit 500 stores a video image in which a person appears, for example. Specifically, the storage unit 500 stores a first video image in which a first person appears. The first person is a person whose posture information is known, for example. The posture information indicates whether the posture of the first person is a specific posture, for example. The posture information may indicate whether the posture of the first person is a posture corresponding to a specific action, for example. The posture information may indicate whether the first person has performed a specific action, for example. Specifically, the first person is a person known to have or have not performed a specific action. The first video image in which the first person appears includes one or more frames, for example. The first video image in which the first person appears is acquired by the acquisition unit 501, for example.

Specifically, the storage unit 500 stores a correct answer label indicating whether the first person has performed a specific action, the correct answer label being associated with the first video image in which the first person appears. Specifically, the storage unit 500 stores a correct answer label indicating whether the first person has performed a specific action in each frame, the correct answer label being associated with each frame of the first video image in which the first person appears. The correct answer label is acquired by the acquisition unit 501, for example. Specifically, the storage unit 500 may store a correct answer label indicating whether the first person has performed a specific action, the correct answer label being associated with the entire first video image in which the first person appears.

Specifically, the storage unit 500 stores a second video image in which a second person appears. The second person is the target person whose posture information is to be estimated, for example. The posture information indicates whether the posture of the second person is a specific posture, for example. The posture information may indicate whether the posture of the second person is a posture corresponding to a specific action, for example. The posture information may indicate whether the second person has performed a specific action, for example. Specifically, the second person is the target person who is subjected to determination as to whether to have performed a specific action. The second video image in which the second person appears includes one or more frames, for example. The second video image in which the second person appears is acquired by the acquisition unit 501, for example.

The storage unit 500 stores, for example, positional information about each of the two body parts that form a pair of body parts among the body parts of the first person in the first video image in which the first person appears. The body parts are the neck, the head, the right shoulder, the left shoulder, the right elbow, the left elbow, the right hand, the left hand, the right knee, the left knee, the right foot, the left foot, and the like, for example. The two body parts are a combination of different body parts that form a pair of left and right parts, for example. Left and right are not left and right in a video image but are left and right referring to the sides of the body in a case where the front on the body is the front direction, and the top side on the body is the upward direction, for example. The two body parts are specifically a combination of the right hand and the left hand.

The positional information indicates, for example, a combination of a plurality of component values in axial directions different from each other, the component values indicating the positions of body parts in a three-dimensional space. The axes are called the X-axis, the Y-axis, and the Z-axis, for example. The positions of the body parts in the three-dimensional space are the positions of the skeletal parts indicating the body parts in the three-dimensional space, for example. The positional information may be vectors, for example.

The positional information may indicate, for example, a combination of a plurality of component values in axial directions different from each other, the component values indicating the positions of body parts in a two-dimensional space. The axes are called the X-axis and the Y-axis, for example. The two-dimensional space may correspond to, for example, a frame, a region having a prescribed size in which a person in the frame appears, or the like. The positions of the body parts in the two-dimensional space are the positions of the skeletal parts indicating the body parts in the two-dimensional space, for example. The positional information may be vectors, for example. The positional information may be polar coordinates, for example.

Specifically, the storage unit 500 stores positional information about each of the two body parts that form a pair of body parts among the body parts of the first person in each frame of the first video image in which the first person appears. The positional information is identified by the identifying unit 502, for example. The positional information may be acquired by the acquisition unit 501, for example.

The storage unit 500 stores, for example, positional information about each of the two body parts that form a pair of body parts among the body parts of the second person in the second video image in which the second person appears. The body parts are the neck, the head, the right shoulder, the left shoulder, the right elbow, the left elbow, the right hand, the left hand, the right knee, the left knee, the right foot, the left foot, and the like, for example. The two body parts are a combination of different body parts that form a pair of left and right parts, for example. The two body parts are specifically a combination of the right hand and the left hand.

The positional information indicates, for example, a combination of a plurality of component values in axial directions different from each other, the component values indicating the positions of body parts in a three-dimensional space. The axes are called the X-axis, the Y-axis, and the Z-axis, for example. The positions of the body parts in the three-dimensional space are the positions of the skeletal parts indicating the body parts in the three-dimensional space, for example. The positional information may be vectors, for example.

The positional information may indicate, for example, a combination of a plurality of component values in axial directions different from each other, the component values indicating the positions of body parts in a two-dimensional space. The axes are called the X-axis and the Y-axis, for example. The two-dimensional space may correspond to, for example, a frame, a region having a prescribed size in which a person in the frame appears, or the like. The positions of the body parts in the two-dimensional space are the positions of the skeletal parts indicating the body parts in the two-dimensional space, for example. The positional information may be vectors, for example. The positional information may be polar coordinates, for example.

Specifically, the storage unit 500 stores positional information about each of the two body parts that form a pair of body parts among the body parts of the second person in each frame of the second video image in which the second person appears. The positional information is identified by the identifying unit 502, for example. The positional information may be acquired by the acquisition unit 501, for example.

The storage unit 500 stores, for example, a component indicating the sum of the positional information about the two respective body parts that form a pair of body parts among the body parts of a person. The storage unit 500 stores, for example, a component indicating the difference in positional information between the two respective body parts that form a pair of body parts among the body parts of a person. The storage unit 500 stores, for example, a component indicating the absolute value of a component indicating the difference in positional information between the two respective body parts that form a pair of body parts among the body parts of a person.

Specifically, the storage unit 500 stores a first component indicating the sum of the positional information about the two respective body parts that form a pair of body parts among the body parts of the first person. The first component is generated by the generation unit 503, for example. Specifically, the storage unit 500 stores a second component indicating the difference in positional information between the two respective body parts that form a pair of body parts among the body parts of the first person. The second component is generated by the generation unit 503, for example. The storage unit 500 stores, for example, a third component indicating the absolute value of the second component indicating the difference in positional information between the two respective body parts that form a pair of body parts among the body parts of the first person. The third component is generated by the generation unit 503, for example. The first component, the second component, and the third component are components of information indicating features of a combination of positional information about the two respective body parts that form a pair of body parts.

Specifically, the storage unit 500 stores a fourth component indicating the sum of the positional information about the two respective body parts that form a pair of body parts among the body parts of the second person. The fourth component is generated by the generation unit 503, for example. Specifically, the storage unit 500 stores a fifth component indicating the difference in positional information between the two respective body parts that form a pair of body parts among the body parts of the second person. The fifth component is generated by the generation unit 503, for example. The storage unit 500 stores, for example, a sixth component indicating the absolute value of the fifth component indicating the difference in positional information between the two respective body parts that form a pair of body parts among the body parts of the second person. The sixth component is generated by the generation unit 503, for example. The fourth component, the fifth component, and the sixth component are components of information indicating features of a combination of positional information about the two respective body parts that form a pair of body parts.

The storage unit 500 stores a model, for example. The model has a function of outputting posture information about a person from a video image in which the person appears, for example. The posture information indicates whether the posture of the person is a specific posture, for example. The posture information may indicate whether the posture of the person is a posture corresponding to a specific action, for example. The posture information may indicate whether the person has performed a specific action, for example.

Specifically, the model has a function of outputting posture information about the second person in response to inputs of the fourth component and the sixth component. Specifically, the model may have a function of outputting posture information about the second person in response to inputs of the fourth component, the fifth component, and the sixth component. The model is an AI model or the like, for example. The model may be formed with a neural network, a mathematical expression, a tree structure, or the like, for example. The model is trained by the training unit 504, for example.

The acquisition unit 501 acquires various kinds of information to be used in the processes by the respective functional units. The acquisition unit 501 stores the acquired various kinds of information into the storage unit 500, or outputs the acquired various kinds of information to each functional unit. Also, the acquisition unit 501 may output the various kinds of information stored in the storage unit 500 to each functional unit. The acquisition unit 501 acquires the various kinds of information based on an operation input by the user, for example. The acquisition unit 501 may receive the various kinds of information from a device different from the information processing device 100, for example.

The acquisition unit 501 acquires a video image in which a person appears, for example. Specifically, the acquisition unit 501 acquires the first video image in which the first person appears. More specifically, the acquisition unit 501 acquires the first video image in which the first person appears, by receiving the first video image from another computer. The another computer is a video imaging device 201, for example. More specifically, the acquisition unit 501 may acquire the first video image in which the first person appears, by receiving an input of the first video image in which the first person appears, based on an operation input by the user.

Specifically, the acquisition unit 501 acquires a correct answer label indicating whether the first person has performed a specific action, the correct answer label being associated with the first video image in which the first person appears. Specifically, the acquisition unit 501 may acquire a correct answer label indicating whether the first person has performed a specific action in each frame, the correct answer label being associated with each frame of the first video image in which the first person appears.

Specifically, the acquisition unit 501 acquires the second video image in which the second person appears. More specifically, the acquisition unit 501 acquires the second video image in which the second person appears, by receiving the second video image from another computer. The another computer is a video imaging device 201, for example. More specifically, the acquisition unit 501 may acquire the second video image in which the second person appears, by receiving an input of the second video image in which the second person appears, based on an operation input by the user.

The acquisition unit 501 may acquire, for example, positional information about each of the two body parts that form a pair of body parts among the body parts of the first person in the first video image in which the first person appears. Specifically, the acquisition unit 501 acquires positional information about each of the two body parts that form a pair of body parts among the body parts of the first person in each frame of the first video image in which the first person appears. More specifically, in a case where the identifying unit 502 does not identify positional information about the respective body parts, the acquisition unit 501 acquires positional information about each of the two body parts that form a pair of body parts among the body parts of the first person in each frame of the first video image in which the first person appears.

The acquisition unit 501 acquires, for example, positional information about each of the two body parts that form a pair of body parts among the body parts of the second person in the second video image in which the second person appears. Specifically, the acquisition unit 501 acquires positional information about each of the two body parts that form a pair of body parts among the body parts of the second person in each frame of the second video image in which the second person appears. More specifically, in a case where the identifying unit 502 does not identify positional information about the respective body parts, the acquisition unit 501 acquires positional information about each of the two body parts that form a pair of body parts among the body parts of the second person in each frame of the second video image in which the second person appears.

The acquisition unit 501 may accept a start trigger to start a process by one of the functional units. The start trigger is a predetermined operation input by the user, for example. The start trigger may be reception of predetermined information from another computer, for example. The start trigger may be an output of predetermined information from one of the functional units, for example.

The acquisition unit 501 may accept, for example, the acquisition of the first video image in which the first person appears as the start trigger for starting processes with the identifying unit 502, the generation unit 503, and the training unit 504. The acquisition unit 501 may accept, for example, the acquisition of the second video image in which the second person appears as the start trigger to start processes with the identifying unit 502, the generation unit 503, and the recognition unit 505.

The acquisition unit 501 may accept, for example, the acquisition of the positional information about each of the two body parts that form a pair of body parts of the first person in the first video image in which the first person appears, as the start trigger to start processes with the generation unit 503 and the training unit 504. The acquisition unit 501 may accept, for example, the acquisition of the positional information about each of the two body parts that form a pair of body parts of the second person in the second video image in which the second person appears, as the start trigger to start processes with the generation unit 503 and the recognition unit 505.

The identifying unit 502 analyzes a video image acquired by the acquisition unit 501, to identify the positional information about each of the two body parts that form a pair of body parts among the body parts of a person in the video image. For example, the identifying unit 502 analyzes the first video image that has been acquired by the acquisition unit 501 and in which the first person appears, to identify the positional information about each of the two body parts that form a pair of body parts among the body parts of the first person in the first video image.

Specifically, the identifying unit 502 analyzes the first video image that has been acquired by the acquisition unit 501 and in which the first person appears, to identify the positional information indicating a plurality of component values in axial directions different from each other, the component values indicating the positions of the respective body parts in a multidimensional space in the first video image. More specifically, the identifying unit 502 analyzes the first video image that has been acquired by the acquisition unit 501 and in which the first person appears, to identify the positional information indicating a plurality of component values in axial directions different from each other, the component values indicating the positions of the respective body parts in a multidimensional space in each frame of the first video image. By doing so, the identifying unit 502 can obtain information that indicates a feature related to the posture of the first person and may serve as a guideline for training a model for estimating the posture information about the first person.

Specifically, the identifying unit 502 may analyze the first video image that has been acquired by the acquisition unit 501 and in which the first person appears, to identify the positions of the skeletal parts of the first person in the first video image, and identify the positional information about the respective body parts based on the identified positions of the skeletal parts of the first person. By doing so, the identifying unit 502 can obtain information that indicates a feature related to the posture of the first person and may serve as a guideline for training a model for estimating the posture information about the first person, utilizing a technique for identifying the positions of skeletal parts.

For example, the identifying unit 502 analyzes the second video image that has been acquired by the acquisition unit 501 and in which the second person appears, to identify the positional information about each of the two body parts that form a pair of body parts among the body parts of the second person in the second video image.

Specifically, the identifying unit 502 analyzes the second video image that has been acquired by the acquisition unit 501 and in which the second person appears, to identify the positional information indicating a plurality of component values in axial directions different from each other, the component values indicating the positions of the respective body parts in a multidimensional space in the second video image. More specifically, the identifying unit 502 analyzes the second video image that has been acquired by the acquisition unit 501 and in which the second person appears, to identify the positional information indicating a plurality of component values in axial directions different from each other, the component values indicating the positions of the respective body parts in a multidimensional space in each frame of the second video image. By doing so, the identifying unit 502 can obtain information that indicates a feature related to the posture of the second person and is to be used in estimating the posture information about the second person, using a model.

Specifically, the identifying unit 502 may analyze the second video image that has been acquired by the acquisition unit 501 and in which the second person appears, to identify the positions of the skeletal parts of the second person in the second video image, and identify the positional information about the respective body parts based on the identified positions of the skeletal parts of the second person.

By doing so, the identifying unit 502 can obtain information that indicates a feature related to the posture of the second person and is to be used in estimating the posture information about the second person with the use of a model, utilizing a technique for identifying the positions of skeletal parts.

The generation unit 503 generates the first component indicating the sum of the positional information about the respective body parts, based on the positional information about the two respective body parts that form a pair of body parts among the body parts of the first person, the positional information having been identified by the identifying unit 502. For example, the generation unit 503 calculates, for each axial direction, an index value using the sum of component values in the axial direction indicated by the positional information about the respective body parts, and generates the first component by combining the calculated index values. An index value is, for example, the value obtained by dividing the sum of component values in an axial direction by a prescribed value. The prescribed value is $\sqrt{2}$, for example. Specifically, for each frame of the first video image in which the first person appears, the generation unit 503 calculates, for each axial direction, an index value using the sum of component values in the axial direction indicated by the positional information about the respective body parts, and generates the first component by combining the calculated index values.

For example, when the positional information about each body part is a vector, the generation unit 503 may generate the sum of the vectors indicated by the positional information about the respective body parts as the first component. In this case, the first component is a vector. Specifically, for each frame of the first video image in which the first person appears, the generation unit 503 generates the sum of the vectors indicated by the positional information about the respective body parts as the first component. As a result, the generation unit 503 can obtain the first component that indicates a feature related to the commonality in positional information between the two respective body parts that form a pair of left and right body parts, and may serve as a guideline at the time of training of a model.

The generation unit 503 generates the second component indicating the difference in positional information between the respective body parts, based on the positional information about the two respective body parts that form a pair of body parts among the body parts of the first person, the positional information having been identified by the identifying unit 502. For example, the generation unit 503 calculates, for each axial direction, an index value using the difference between component values in the axial direction indicated by the positional information about the respective body parts, and generates the second component by combining the calculated index values. An index value is, for example, the value obtained by dividing the difference between component values in an axial direction by a prescribed value. The prescribed value is $\sqrt{2}$, for example. Specifically, for each frame of the first video image in which the first person appears, the generation unit 503 calculates, for each axial direction, an index value using the difference between component values in the axial direction indicated by the positional information about the respective body parts, and generates the second component by combining the calculated index values.

For example, when the positional information about each of the two body parts that form a pair of body parts among the body parts of the first person is a vector, the generation unit 503 may generate the difference between the vectors indicated by the positional information about the respective body parts as the second component. Specifically, for each frame of the first video image in which the first person appears, the generation unit 503 generates the difference between the vectors indicated by the positional information about the respective body parts as the second component. In this case, the second component is a vector. As a result, the generation unit 503 can obtain the second component that indicates a feature related to the difference in positional information between the two respective body parts that form a pair of left and right body parts, and may serve as a guideline at the time of training of a model.

The generation unit 503 generates the third component indicating the absolute value of the second component indicating the difference in positional information between the respective body parts, based on the positional information about the two respective body parts that form a pair of body parts among the body parts of the first person, the positional information having been identified by the identifying unit 502. For example, the generation unit 503 calculates, for each axial direction, an index value using the absolute value of the difference between component values in the axial direction indicated by the positional information about the respective body parts, and generates the third component by combining the calculated index values. An index value is, for example, the value obtained by dividing the absolute value of the difference between component values in an axial direction by a prescribed value. The prescribed value is $\sqrt{2}$, for example. Specifically, for each frame of the first video image in which the first person appears, the generation unit 503 calculates, for each axial direction, an index value using the absolute value of the difference between component values in the axial direction indicated by the positional information about the respective body parts, and generates the third component by combining the calculated index values.

For example, when the positional information about each of the two body parts that form a pair of body parts among the body parts of the first person is a vector, the generation unit 503 generates, as the third component, a vector that is in a prescribed direction and has the absolute value of the vector of the second component as its magnitude. In this case, the third component is a vector. The absolute value of the vector of the second component indicates the length of the vector of the second component. The prescribed direction is determined by the direction of the difference between the vectors of the second component, in accordance with a predetermined rule, for example.

The predetermined rule is a rule for determining the direction of the vector of the third component to be either the same direction as the direction of the vector of the second component or the direction opposite to the direction of the vector of the second component. The predetermined rule is a rule for integrally determining the direction of the vector of the third component to be the same direction as the direction of the vector of the second component or the direction opposite to the direction of the vector of the second component, whichever is a direction in which the directional component in one of the axial directions is positive.

Specifically, for each frame of the first video image in which the first person appears, the generation unit 503 generates, as the third component, a vector that is in a prescribed direction and has the absolute value of the vector of the second component as its magnitude. As a result, the generation unit 503 can obtain the third component that does not depend on a reversal of the movement of each of the two body parts that form a pair of left and right body parts, while expressing a feature related to the difference in positional information between the two respective body parts that form a pair of left and right body parts. The generation unit 503 can obtain the third component that may serve as a guideline at the time of training of a model.

The generation unit 503 generates the fourth component indicating the sum of the positional information about the respective body parts, based on the positional information about the two respective body parts that form a pair of body parts among the body parts of the second person, the positional information having been identified by the identifying unit 502. For example, the generation unit 503 calculates, for each axial direction, an index value using the sum of component values in the axial direction indicated by the positional information about the respective body parts, and generates the fourth component by combining the calculated index values. An index value is, for example, the value obtained by dividing the sum of component values in an axial direction by a prescribed value. The prescribed value is $\sqrt{2}$, for example. Specifically, for each frame of the second video image in which the second person appears, the generation unit 503 calculates, for each axial direction, an index value using the sum of component values in the axial direction indicated by the positional information about the respective body parts, and generates the fourth component by combining the calculated index values.

For example, when the positional information about each body part is a vector, the generation unit 503 may generate the sum of the vectors indicated by the positional information about the respective body parts as the fourth component. In this case, the fourth component is a vector. Specifically, for each frame of the second video image in which the second person appears, the generation unit 503 generates the sum of the vectors indicated by the positional information about the respective body parts as the fourth component. As a result, the generation unit 503 can obtain the fourth component that indicates a feature related to the commonality in positional information between the two respective body parts that form a pair of left and right body parts, and may serve as a guideline at the time of estimation of posture information about the second person with the use of a model.

The generation unit 503 generates the fifth component indicating the difference in positional information between the respective body parts, based on the positional information about the two respective body parts that form a pair of body parts among the body parts of the second person, the positional information having been identified by the identifying unit 502. For example, the generation unit 503 calculates, for each axial direction, an index value using the difference between component values in the axial direction indicated by the positional information about the respective body parts, and generates the fifth component by combining the calculated index values. An index value is, for example, the value obtained by dividing the difference between component values in an axial direction by a prescribed value. The prescribed value is $\sqrt{2}$, for example. Specifically, for each frame of the second video image in which the second person appears, the generation unit 503 calculates, for each axial direction, an index value using the difference between component values in the axial direction indicated by the positional information about the respective body parts, and generates the fifth component by combining the calculated index values.

For example, when the positional information about each of the two body parts that form a pair of body parts among the body parts of the second person is a vector, the generation unit 503 may generate the difference between the vectors indicated by the positional information about the respective body parts as the fifth component. In this case, the fifth component is a vector. Specifically, for each frame of the second video image in which the second person appears, the generation unit 503 generates the difference between the vectors indicated by the positional information about the respective body parts as the fifth component. As a result, the generation unit 503 can obtain the fifth component that indicates a feature related to the difference in positional information between the two respective body parts that form a pair of left and right body parts, and may serve as a guideline at the time of estimation of posture information about the second person with the use of a model.

The generation unit 503 generates the sixth component indicating the absolute value of the fifth component indicating the difference in positional information between the respective body parts, based on the positional information about the two respective body parts that form a pair of body parts among the body parts of the second person, the positional information having been identified by the identifying unit 502. For example, the generation unit 503 calculates, for each axial direction, an index value using the absolute value of the difference between component values in the axial direction indicated by the positional information about the respective body parts, and generates the sixth component by combining the calculated index values. An index value is, for example, the value obtained by dividing the absolute value of the difference between component values in an axial direction by a prescribed value. The prescribed value is $\sqrt{2}$, for example. Specifically, for each frame of the second video image in which the second person appears, the generation unit 503 calculates, for each axial direction, an index value using the absolute value of the difference between component values in the axial direction indicated by the positional information about the respective body parts, and generates the sixth component by combining the calculated index values.

For example, when the positional information about each of the two body parts that form a pair of body parts among the body parts of the second person is a vector, the generation unit 503 generates, as the sixth component, a vector that is in a prescribed direction and has the absolute value of the vector of the fifth component as its magnitude. In this case, the sixth component is a vector. The absolute value of the vector of the fifth component indicates the length of the vector of the fifth component. The prescribed direction is determined by the direction of the difference between the vectors of the fifth component, in accordance with a predetermined rule, for example.

The predetermined rule is a rule for determining the direction of the vector of the sixth component to be either the same direction as the direction of the vector of the fifth component or the direction opposite to the direction of the vector of the fifth component. The predetermined rule is a rule for integrally determining the direction of the vector of the sixth component to be the same direction as the direction of the vector of the fifth component or the direction opposite to the direction of the vector of the fifth component, whichever is a direction in which the directional component in one of the axial directions is positive.

Specifically, for each frame of the second video image in which the second person appears, the generation unit 503 generates, as the sixth component, a vector that is in a prescribed direction and has the absolute value of the vector of the fifth component as its magnitude. As a result, the generation unit 503 can obtain the sixth component that does not depend on a reversal of the movement of each of the two body parts that form a pair of left and right body parts, while expressing a feature related to the difference in positional information between the two respective body parts that form a pair of left and right body parts. The generation unit 503 can obtain the sixth component that may serve as a guideline at the time of estimation of posture information about the second person with the use of a model.

The training unit 504 trains a model that outputs posture information about the second person from the second video image in which the second person appears, based on the generated first component and the generated third component. For example, the training unit 504 generates training data in which a combination of the generated first component and the generated third component is associated with the correct answer label acquired by the acquisition unit 501.

Specifically, for each frame of the first video image in which the first person appears, the training unit 504 generates training data in which a combination of the generated first component and the generated third component is associated with the correct answer label acquired by the acquisition unit 501. Specifically, the training unit 504 may generate training data in which a combination of the time series of the generated first component and the time series of the generated third component in the first video image in which the first person appears is associated with the correct answer label corresponding to the entire first video image acquired by the acquisition unit 501.

For example, the training unit 504 trains a model, based on the generated training data. Specifically, using logistic regression, the training unit 504 trains a model, based on the generated training data. Specifically, using error back-propagation, the information processing device 100 may train a model, based on the generated training data.

Thus, the training unit 504 can train a model. For example, the training unit 504 can train a model that can accurately estimate posture information about the second person from a video image in which the second person appears. Using the trained model, the training unit 504 can recognize actions of the same type related to the two respective body parts forming a pair of body parts as the same actions.

The training unit 504 may train a model that outputs posture information about the second person from the second video image in which the second person appears, based on the generated first component, the generated second component, and the generated third component. For example, the training unit 504 generates training data in which a combination of the generated first component, the generated second component, and the generated third component is associated with the correct answer label acquired by the acquisition unit 501.

Specifically, for each frame of the first video image in which the first person appears, the training unit 504 generates training data in which a combination of the generated first component, the generated second component, and the generated third component is associated with the correct answer label acquired by the acquisition unit 501. Specifically, the training unit 504 may generate training data in which a combination of the time series of the generated first component, the time series of the generated second component, and the time series of the generated third component in the first video image in which the first person appears is associated with the correct answer label corresponding to the entire first video image.

For example, the training unit 504 trains a model, based on the generated training data. Specifically, using logistic regression, the training unit 504 trains a model, based on the generated training data. Specifically, using error back-propagation, the information processing device 100 may train a model, based on the generated training data.

Thus, the training unit 504 can train a model. For example, the training unit 504 can train a model that can accurately estimate posture information about the second person from a video image in which the second person appears. Using the trained model, the training unit 504 can recognize actions of the same type related to the two respective body parts forming a pair of body parts as the same actions.

The recognition unit 505 acquires the posture information about the second person using the trained model, based on the generated fourth component and the generated sixth component. For example, the recognition unit 505 generates input data including a combination of the generated fourth component and the generated sixth component as an explanatory variable. The input data may further include, as an explanatory variable, positional information about body parts that do not form any pair among the body parts of the second person, for example.

Specifically, for each frame of the second video image in which the second person appears, the recognition unit 505 generates input data including a combination of the generated fourth component and the generated sixth component as an explanatory variable. Specifically, the recognition unit 505 may generate input data including, as an explanatory variable, a combination of the time series of the generated fourth component and the time series of the generated sixth component in the second video image in which the second person appears.

For example, the recognition unit 505 inputs the generated input data to the trained model, to estimate the posture information about the second person using the trained model, and acquires the posture information about the second person output from the trained model. Thus, the recognition unit 505 can accurately obtain the posture information about the second person.

The recognition unit 505 may acquire the posture information about the second person using the trained model, based on the generated fourth component, the generated fifth component, and the generated sixth component. For example, the recognition unit 505 generates input data including, as an explanatory variable, a combination of the generated fourth component, the generated fifth component, and the generated sixth component.

Specifically, for each frame of the second video image in which the second person appears, the recognition unit 505 generates input data including, as an explanatory variable, a combination of the generated fourth component, the generated fifth component, and the generated sixth component. Specifically, the recognition unit 505 may generate input data including, as an explanatory variable, a combination of the time series of the generated fourth component, the time series of the generated fifth component, and the time series of the generated sixth component in the second video image in which the second person appears.

For example, the recognition unit 505 inputs the generated input data to the trained model, to estimate the posture information about the second person using the trained model, and acquires the posture information about the second person output from the trained model. Thus, the recognition unit 505 can accurately obtain the posture information about the second person.

The output unit 506 outputs a result of processing by at least one of the functional units. The output format is, for example, display on a display, print output to a printer, transmission to an external device by the network I/F 303, or storage in a storage area such as the memory 302 or the recording medium 305. Thus, the output unit 506 enables notification of a result of processing by at least one of functional units to the user, and can improve user-friendliness of the information processing device 100.

The output unit 506 outputs the model trained by the training unit 504, for example. Specifically, the output unit 506 transmits the model trained by the training unit 504 to another computer. The another computer is a client device 202 or the like, for example. Thus, the output unit 506 can make a useful model available in another computer.

The output unit 506 outputs the posture information about the second person acquired by the recognition unit 505, for example. Specifically, the output unit 506 outputs the posture information about the second person so that the user can refer to the posture information. Specifically, the output unit 506 may transmit the posture information about the second person to another computer. The another computer is a client device 202 or the like, for example. Thus, the output unit 506 can make the posture information about the second person available.

Although a case where the information processing device 100 includes the acquisition unit 501, the identifying unit 502, the generation unit 503, the training unit 504, the recognition unit 505, and the output unit 506 has been described herein, the embodiment is not limited to this. For example, there may be a case where the information processing device 100 does not include one of the functional units, and may be able to communicate with another computer including the functional unit. Specifically, there may be a case where the information processing device 100 does not include the recognition unit 505.

Flow in an Operation of the Information Processing Device 100

Next, the flow in an operation of the information processing device 100 is described with reference to FIG. 6.

Figure 6:
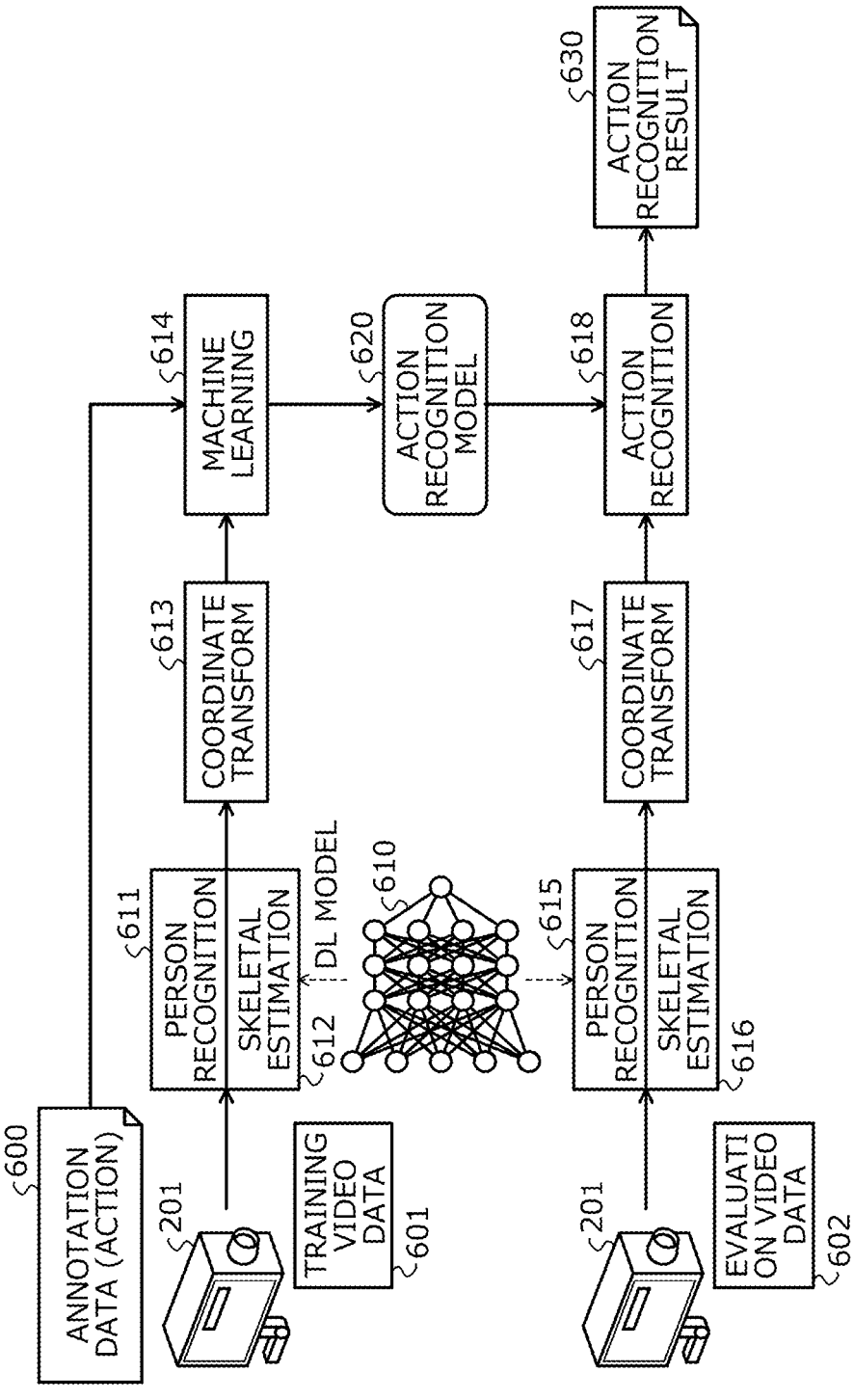
FIG. 6 is an explanatory diagram illustrating a flow of an operation of the information processing device 100.

FIG. 6 is an explanatory diagram illustrating the flow in an operation of the information processing device 100. In FIG. 6, (6-1) the information processing device 100 receives training video data 601 including a plurality of frames in which a person appears, from a video imaging device 201. The information processing device 100 acquires annotation data 600 including a correct answer label indicating the person's action corresponding to each frame of the training video data 601, based on an operation input by the user. The correct answer label indicates whether the person is performing a specific action, for example.

(6-2) The information processing device 100 stores a deep learning (DL) model 610. The DL model 610 has a function of estimating, from a frame of video data, coordinate information about each skeletal part of a plurality of skeletal parts of a person appearing in the frame. The skeletal parts correspond to body parts. The body parts are the neck, the head, the right shoulder, the left shoulder, the right elbow, the left elbow, the right hand, the left hand, the right knee, the left knee, the right foot, the left foot, and the like, for example.

The coordinate information indicates, for example, a combination of a plurality of component values in axial directions different from each other, the component values indicating the positions of the respective skeletal parts in a three-dimensional space. Specifically, the coordinate information includes a combination of a component value in the X-axis direction, a component value in the Y-axis direction, and a component value in the Z-axis direction. The DL model 610 has a function of outputting the coordinate information about each skeletal part of a plurality of skeletal parts of a person appearing in a frame, in response to an input of the frame of video data, for example.

(6-3) The information processing device 100 performs a process of person recognition 611, to recognize a person appearing in each frame of the training video data 601, based on the received training video data 601. The information processing device 100 performs a process of skeletal estimation 612, to acquire the coordinate information about each skeletal part of a plurality of skeletal parts of the recognized person in each frame of the training video data 601, using the DL model 610.

(6-4) The information processing device 100 identifies a pair of two skeletal parts that form a pair of left and right skeletal parts among the skeletal parts of the person. The pair is a combination of the right-hand skeletal part corresponding to the right hand and the left-hand skeletal part corresponding to the left hand, for example. The pair may be a combination of the right-elbow skeletal part corresponding to the right elbow and the left-elbow skeletal part corresponding to the left elbow, for example. The information processing device 100 extracts the coordinate information about each of the two skeletal parts that form the specified pair of skeletal parts in the acquired coordinate information about the respective skeletal parts of the plurality of skeletal parts in each frame of the training video data 601.

(6-5) The information processing device 100 performs a process of coordinate transform 613, to transform the extracted combination of the coordinate information about the two respective skeletal parts in each frame of the training video data 601 into a combination of two pieces of coordinate information in a special orthogonal coordinate system. The special orthogonal coordinate system is an orthogonal coordinate system for integrally handling symmetrical movements of the two respective skeletal part that form a pair of left and right skeletal parts.

Specifically, assuming an orthogonal coordinate system in which the X-axis related to one skeletal part of two skeletal parts and the X-axis related to the other skeletal part are orthogonal to each other, it is conceivable that another orthogonal coordinate system having a 45-degree line in the orthogonal coordinate system as one of the axes may be adopted as a special orthogonal coordinate system. The 45-degree line corresponds to, for example, a straight line defined by a mathematical expression expressing that "the component value of the X-axis related to one skeletal part=the component value of the X-axis related to the other skeletal part".

Likewise, specifically, assuming an orthogonal coordinate system in which the Y-axis related to one skeletal part of two skeletal parts and the Y-axis related to the other skeletal part are orthogonal to each other, it is conceivable that another orthogonal coordinate system having a 45-degree line in the orthogonal coordinate system as one of the axes may be adopted as a special orthogonal coordinate system. The 45-degree line corresponds to, for example, a straight line defined by a mathematical expression expressing that "the component value of the Y-axis related to one skeletal part=the component value of the Y-axis related to the other skeletal part".

Likewise, specifically, assuming an orthogonal coordinate system in which the Z-axis related to one skeletal part of two skeletal parts and the Z-axis related to the other skeletal part are orthogonal to each other, it is conceivable that another orthogonal coordinate system having a 45-degree line in the orthogonal coordinate system as one of the axes may be adopted as a special orthogonal coordinate system. The 45-degree line corresponds to, for example, a straight line defined by a mathematical expression expressing that "the component value of the Z-axis related to one skeletal part=the component value of the Z-axis related to the other skeletal part". A specific example of a special orthogonal coordinate system will be described later with reference to FIGS. 9 and 10. A specific example of transform will be described later with reference to FIGS. 9 and 10.

(6-6) The information processing device 100 generates model training data in which a correct answer label is associated with a combination of two pieces of coordinate information in the transformed special orthogonal coordinate system in each frame of the training video data 601. The information processing device 100 performs a process of machine learning 614, to train an action recognition model 620, based on the generated model training data.

The action recognition model 620 has a function of outputting a label indicating whether a person is performing a specific action in a frame of video data in which the person appears, in response to an input of a feature related to a posture of the person in the frame, for example. The feature related to the posture of the person is, for example, a combination of two pieces of coordinate information in the special orthogonal coordinate system. As a result, the information processing device 100 can obtain the action recognition model 620 capable of accurately estimating a label indicating whether a person is performing a specific action in a frame of a video image in which the person appears.

(6-7) The information processing device 100 receives evaluation video data 602 including a plurality of frames in which a person appears, from a video imaging device 201.

(6-8) The information processing device 100 performs a process of person recognition 615, to recognize a person appearing in each frame of the evaluation video data 602, based on the received evaluation video data 602. The information processing device 100 performs a process of skeletal estimation 616, to acquire the coordinate information about each skeletal part of a plurality of skeletal parts of the recognized person in each frame of the evaluation video data 602, using the DL model 610.

(6-9) The information processing device 100 identifies a pair of two skeletal parts that form a pair of left and right skeletal parts among the skeletal parts of the person. The pair is a combination of the right-hand skeletal part corresponding to the right hand and the left-hand skeletal part corresponding to the left hand, for example. The pair may be a combination of the right-elbow skeletal part corresponding to the right elbow and the left-elbow skeletal part corresponding to the left elbow, for example. The information processing device 100 extracts the coordinate information about each of the two skeletal parts that form the specified pair of skeletal parts in the acquired coordinate information about the respective skeletal parts of the plurality of skeletal parts in each frame of the evaluation video data 602.

(6-10) The information processing device 100 performs a process of coordinate transform 617, to transform the extracted combination of the coordinate information about the two respective skeletal parts in each frame of the evaluation video data 602 into a combination of two pieces of coordinate information in a special orthogonal coordinate system. The special orthogonal coordinate system is an orthogonal coordinate system for integrally handling symmetrical movements of the two respective skeletal part that form a pair of left and right skeletal parts.

(6-11) The information processing device 100 generates model input data that includes, as an explanatory variable, a combination of two pieces of coordinate information in the transformed special orthogonal coordinate system in each frame of the evaluation video data 602. By performing a process of action recognition 618, the information processing device 100 acquires a label indicating whether the person is performing a specific action in the frame based on the model input data in each frame of the evaluation video data 602, using the action recognition model 620. As a result, the information processing device 100 can accurately obtain the label indicating whether a person is performing a specific action in a frame of a video image in which the person appears.

Example Operation of the Information Processing
Device 100

Figure 7:
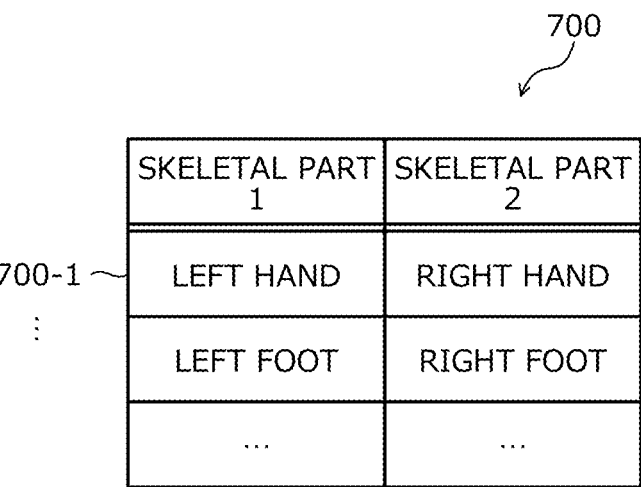
FIG. 7 is a table for explaining and illustrating an example of contents stored in a pair management table 700.

Next, an example operation of the information processing device 100 is described with reference to FIGS. 7 to 20. Referring first to FIG. 7, an example of the stored content of a pair management table 700 stored in the information processing device 100 is described. The pair management table 700 is designed to enable identifying of the pair of two skeletal parts forming a pair of left and right skeletal parts among a plurality of skeletal parts of a person. The pair management table 700 is implemented by a storage area such as the memory 302 or the recording medium 305 of the information processing device 100 illustrated in FIG. 3, for example.

FIG. 7 is a table for explaining and illustrating an example of the contents stored in the pair management table 700. As illustrated in FIG. 7, the pair management table 700 includes fields of skeletal part 1 and skeletal part 2. In the pair management table 700, information is set in each field for each pair that is a combination of two skeletal parts, and pair information is stored as a record 700-a. a is an integer.

In a field of skeletal part 1, the type of one skeletal part among a plurality of skeletal parts of the person is set. The type is indicated by the name of the body part, for example. In a field of skeletal part 2, the type of a skeletal part different from the above one skeletal part among the plurality of skeletal parts of the person is set, the combination of the above one skeletal part and the different skeletal part being the two skeletal parts forming a pair. Thus, the information processing device 100 can refer to the pair management table 700, to identify the pair of two skeletal parts forming a pair of left and right skeletal parts among a plurality of skeletal parts of a person.

The following is a description of an example in which the information processing device 100 acquires the training video data 601 including a plurality of frames in which a person appears, generates a plurality of pieces of training data, based on the training video data 601, and trains the action recognition model 620, based on the plurality of pieces of the generated training data. The information processing device 100 stores the DL model 610.

The information processing device 100 receives the training video data 601 from a video imaging device 201. The information processing device 100 acquires the annotation data 600 including a correct answer label indicating a person's action corresponding to each frame of the training video data 601, based on an operation input by the user. The information processing device 100 performs the process of person recognition 611, to recognize the person appearing in each frame of the training video data 601, based on the received training video data 601.

Figure 8:
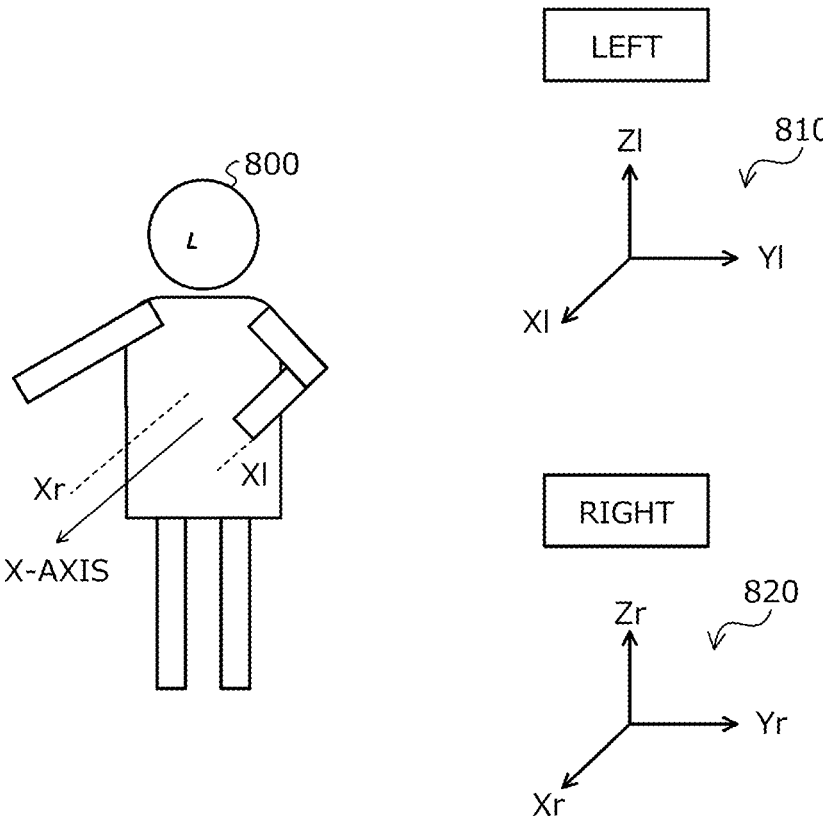
FIG. 8 is an explanatory diagram illustrating an example of acquisition of coordinate information about each skeletal part.

Next, referring to FIG. 8, an example in which the information processing device 100 performs the process of skeletal estimation 612 to acquire the coordinate information about each skeletal part of a plurality of skeletal parts of the recognized person in each frame of the training video data 601, using the DL model 610, is described.

FIG. 8 is an explanatory diagram illustrating an example of acquisition of coordinate information about the respective skeletal parts. As indicated by reference numeral 800 in FIG. 8, the information processing device 100 acquires coordinate information about each skeletal part in a three-dimensional orthogonal coordinate system in which the front direction of the person is the X-axis, a lateral direction of the person is the Y-axis, and the vertical direction of the person is the Z-axis.

In the description below, as indicated by reference numeral 810 in FIG. 8, the X-axis related to the skeletal parts belonging to the left side of the body is expressed as an Xl-axis. As indicated by reference numeral 820 in FIG. 8, the X-axis related to the skeletal parts belonging to the right side of the body is expressed as an Xr-axis. The X-axes related to the respective skeletal parts are distinguished from each other.

Likewise, as indicated by reference numeral 810 in FIG. 8, the Y-axis related to the skeletal parts belonging to the left side of the body is expressed as a Yl-axis. As indicated by reference numeral 820 in FIG. 8, the Y-axis related to the skeletal parts belonging to the right side of the body is expressed as a Yr-axis. The Y-axes related to the respective skeletal parts are distinguished from each other.

Likewise, as indicated by reference numeral 810 in FIG. 8, the Z-axis related to the skeletal parts belonging to the left side of the body is expressed as a Zl-axis. As indicated by reference numeral 820 in FIG. 8, the Z-axis related to the skeletal parts belonging to the right side of the body is expressed as a Zr-axis. The Z-axes related to the respective skeletal parts are distinguished from each other.

In the description below, the coordinate information about a skeletal part belonging to the left side of the body is a combination of a coordinate value xl of the Xl-axis, a coordinate value yl of the Yl-axis, and a coordinate value zl of the Zl-axis, for example. Likewise, in the description below, the coordinate information about a skeletal part belonging to the right side of the body is a combination of a coordinate value xr of the Xr-axis, a coordinate value yr of the Yr-axis, and a coordinate value zr of the Zr-axis, for example.

Specifically, the information processing device 100 acquires at least the coordinate information (xl, yl, zl) about the left-hand skeletal part corresponding to the left hand among a plurality of skeletal parts of the person in each frame of the training video data 601. Specifically, the information processing device 100 acquires at least the coordinate information (xr, yr, zr) about the right-hand skeletal part corresponding to the right hand among the plurality of skeletal parts of the person in each frame of the training video data 601.

The information processing device 100 refers to the pair management table 700, and identifies a pair of the right-hand skeletal part corresponding to the right hand and the left-hand skeletal part corresponding to the left hand, which form a pair of left and right skeletal parts among the skeletal parts of the person. The information processing device 100 extracts the coordinate information (xl, yl, zl) about the left-hand skeletal part and the coordinate information (xr, yr, zr) about the right-hand skeletal part from the acquired coordinate information about the respective skeletal parts in the plurality of skeletal parts in each frame of the training video data 601.

Figure 9:
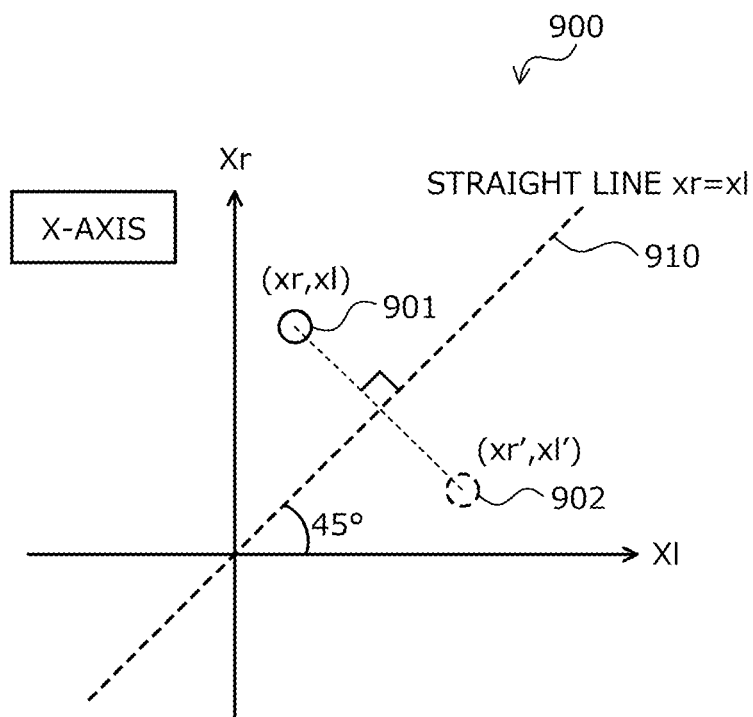
FIG. 9 is a graph for explaining and illustrating an example in which coordinate information is transformed (part 1)
Figure 10:
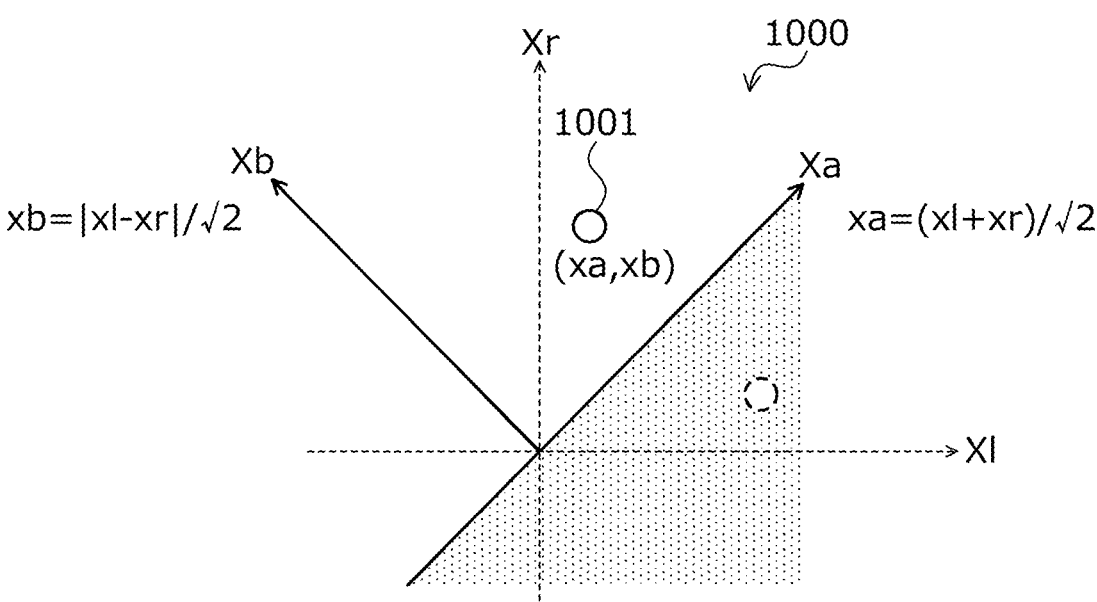
FIG. 10 is a graph for explaining and illustrating an example in which coordinate information is transformed (part 2)

Next, referring to FIGS. 9 and 10, an example in which the information processing device 100 transforms the extracted coordinate information is described. Specifically, an example in which the information processing device 100 transforms the combination of the coordinate information (xl, yl, zl) about the left-hand skeletal part and the coordinate information (xr, yr, zr) about the right-hand skeletal part into a combination of two pieces of coordinate information in a special orthogonal coordinate system is described.

FIGS. 9 and 10 are graphs for explaining and illustrating an example in which coordinate information is transformed. In FIG. 9, the information processing device 100 identifies combinations of coordinate values corresponding to each other between the coordinate information (xl, yl, zl) about the left-hand skeletal part and the coordinate information (xr, yr, zr) about the right-hand skeletal part in each frame of the training video data 601.

Specifically, the information processing device 100 identifies a combination (xl, xr) of the coordinate value xl of the left-hand skeletal part and the coordinate value xr of the right-hand skeletal part in each frame of the training video data 601. Likewise, the information processing device 100 identifies, specifically, a combination (yl, yr) of the coordinate value yl of the left-hand skeletal part and the coordinate value yr of the right-hand skeletal part in each frame of the training video data 601. Likewise, the information processing device 100 identifies, specifically, a combination (zl, zr) of the coordinate value zl of the left-hand skeletal part and the coordinate value zr of the right-hand skeletal part in each frame of the training video data 601.

Here, in the orthogonal coordinate system 900 of the Xl-axis and the Xr-axis, there may be a case where the point 902 of a combination (xl', xr') exists line-symmetrically with the point 901 of the combination (xl, xr) with respect to the 45-degree line 910 defined by the mathematical expression, xr=xl. The posture of the person corresponding to the point 901 of the combination (xl, xr) and the posture of the person corresponding to the point 902 of the combination (xl', xr') are postures that are left-right reversals of each other.

Here, to handle actions of the same type using the two respective skeletal parts that form a pair of left and right skeletal parts as the same actions, it is preferable to regard the bilaterally symmetrical postures or movements of the person as the same postures or movements. Therefore, it is conceivable that a new orthogonal coordinate system may be set so as to transform the combination (xl, xr) and the combination (xl', xr') into index values that are the same as each other. Here, referring to FIG. 10, a new orthogonal coordinate system 1000 is described.

As illustrated in FIG. 10, the new orthogonal coordinate system 1000 is an orthogonal coordinate system of an Xa-axis and an Xb-axis. The Xa-axis corresponds to the 45-degree line 910 of the orthogonal coordinate system 900. The Xb-axis corresponds to a straight line that passes through the origin of the orthogonal coordinate system 900 and is orthogonal to the 45-degree line 910 of the orthogonal coordinate system 900. The relationship between the combination (xl, xr) and the component value xa of the Xa-axis of the orthogonal coordinate system 1000 is expressed as $xa=(xl+xr)/\sqrt{2}$. The relationship between the combination (xl, xr) and the component value xb of the Xb-axis of the orthogonal coordinate system 1000 is expressed as $xb=|xl-xr|/\sqrt{2}$.

Here, $(xl+xr)/\sqrt{2}=(xl'+xr')/\sqrt{2}$. Also, $|xl-xr|/\sqrt{2}=|xl'-xr'|/\sqrt{2}$. Accordingly, it is conceivable that both the combination (xl, xr) and the combination (xl', xr') can be transformed into index values that are the same as each other in the orthogonal coordinate system 1000.

Also, it is conceivable that the coordinate value $xa=(xl+xr)/\sqrt{2}$ can express a feature related to the commonality in the combination (xl, xr). On the other hand, since $|xl-xr|/\sqrt{2}=|xl'-xr'|/\sqrt{2}$ is satisfied, it is conceivable that $xb=|xl-xr|/\sqrt{2}$ can express a feature related to the difference in the combination (xl, xr), while bilaterally symmetrical postures or movements of the person are handled as the same postures or movements.

The information processing device 100 transforms the combination (xl, xr) in each frame of the training video data 601 into a combination (xa, xb). By doing so, the information processing device 100 can obtain a feature amount accurately indicating the feature of a posture or a movement of the person, while handling bilaterally symmetrical postures or movements of the person as the same postures or movements. Specifically, the information processing device 100 can transform the combination (xl, xr) into the combination (xa, xb), while leaving information amounts other than the left and right distinctions.

Also, the information processing device 100 can obtain the combination (xa, xb) so that the combination (xa, xb) has a property of continuously changing in chronological order. The combination (xa, xb) corresponds to a point 1001. In this manner, the information processing device 100 can obtain the combination (xa, xb) that is a feature amount suitable for training of the action recognition model 620 capable of recognizing actions of the same type related to the two respective skeletal parts that form a pair of left and right skeletal parts as the same actions.

Likewise, the information processing device 100 transforms the combination (yl, yr) in each frame of the training video data 601 into a combination (ya, yb). Likewise, the information processing device 100 transforms the combination (zl, zr) in each frame of the training video data 601 into a combination (za, zb). Thus, the information processing device 100 can obtain a feature amount suitable for training of the action recognition model 620 for each of the X-axis, the Y-axis, and the Z-axis.

The information processing device 100 combines the transformed combinations in each frame of the training video data 601, identifies the entire combination (xa, ya, za, xb, yb, zb), and generates model training data by associating the correct answer label corresponding to the frame to the entire combination. The information processing device 100 performs the process of machine learning 614, to train the action recognition model 620, based on the generated model training data. Thus, the information processing device 100 can train the action recognition model 620 capable of accurately recognizing actions of the same type related to the two respective skeletal parts that form a pair of left and right skeletal parts as the same actions.

Next, referring to FIGS. 11 to 20, examples of numerical values indicating effects of the information processing device 100 are described.

Figure 11:
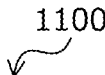
FIG. 11 is a table for explaining and illustrating an example of numerical values indicating effects of the information processing device 100 (part 1)

FIGS. 11 to 20 are tables/graphs for explaining and illustrating examples of numerical values indicating effects of the information processing device 100. In FIG. 11, the coordinate information (xl, yl, zl) about the left-hand skeletal part and the coordinate information (xr, yr, zr) about the right-hand skeletal part that are based on leftward video data depicting a situation in which a person bends down and picks up an object with the "left hand", and are in the frames of the respective seconds of the leftward video data are illustrated in a table 1100.

The table 1100 has fields of the second, the left hand xl, the left hand yl, the left hand zl, the right hand xr, the right hand yr, and the right hand zr. In each field of the second, the number of seconds indicating to which second the frame of the leftward video data belongs is set.

In each field of the left hand xl, the coordinate value xl of the left-hand skeletal part with respect to the Xl-axis in the frame of the above number of seconds is set. The unit of the coordinate value xl is pixel, for example. In each field of the left hand yl, the coordinate value yl of the left-hand skeletal part with respect to the Yl-axis in the frame of the above number of seconds is set. The unit of the coordinate value yl is pixel, for example. In each field of the left hand zl, the coordinate value zl of the left-hand skeletal part with respect to the Zl-axis in the frame of the above number of seconds is set. The unit of the coordinate value zl is pixel, for example.

In each field of the right hand xr, the coordinate value xr of the right-hand skeletal part with respect to the Xr-axis in the frame of the above number of seconds is set. The unit of the coordinate value xr is pixel, for example. In each field of the right hand yr, the coordinate value yr of the right-hand skeletal part with respect to the Yr-axis in the frame of the above number of seconds is set. The unit of the coordinate value yr is pixel, for example. In each field of the right hand zr, the coordinate value zr of the right-hand skeletal part with respect to the Zr-axis in the frame of the above number of seconds is set. The unit of the coordinate value zr is pixel, for example. Next, the description moves on to FIG. 12.

Figure 12:
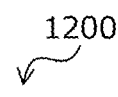
FIG. 12 is a graph for explaining and illustrating an example of numerical values indicating effects of the information processing device 100 (part 2)

In FIG. 12, the time series of the coordinate information (xl, yl, zl) about the left-hand skeletal part illustrated in FIG. 11 and the time series of the coordinate information (xr, yr, zr) about the right-hand skeletal part illustrated in FIG. 11 are illustrated in a graph 1200. The ordinate axis of the graph 1200 indicates pixel. The abscissa axis of the graph 1200 indicates the second. Next, the description moves on to FIG. 13.

Figure 13:
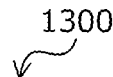
FIG. 13 is a table for explaining and illustrating an example of numerical values indicating effects of the information processing device 100 (part 3)

In FIG. 13, the leftward video data in which a person bends down and picks up an object with the "left hand" is horizontally inverted, and the horizontally inverted video data is handled as rightward video data depicting a situation in which a person bends down and picks up an object with the "right hand". The coordinate information (xl, yl, zl) about the left-hand skeletal part and the coordinate information (xr, yr, zr) about the right-hand skeletal part that are based on rightward video data in which a person bends down and picks up an object with the "right hand", and are in the frames of the respective seconds of the rightward video data are illustrated in a table 1300.

The table 1300 has fields of the second, the left hand xl, the left hand yl, the left hand zl, the right hand xr, the right hand yr, and the right hand zr. The contents of the respective fields in the table 1300 are similar to the contents of the respective fields in the table 1100, and therefore, explanation thereof is not made herein. Next, the description moves on to FIG. 14.

Figure 14:
FIG. 14 is a graph for explaining and illustrating an example of numerical values indicating effects of the information processing device 100 (part 4)
Figure 14:
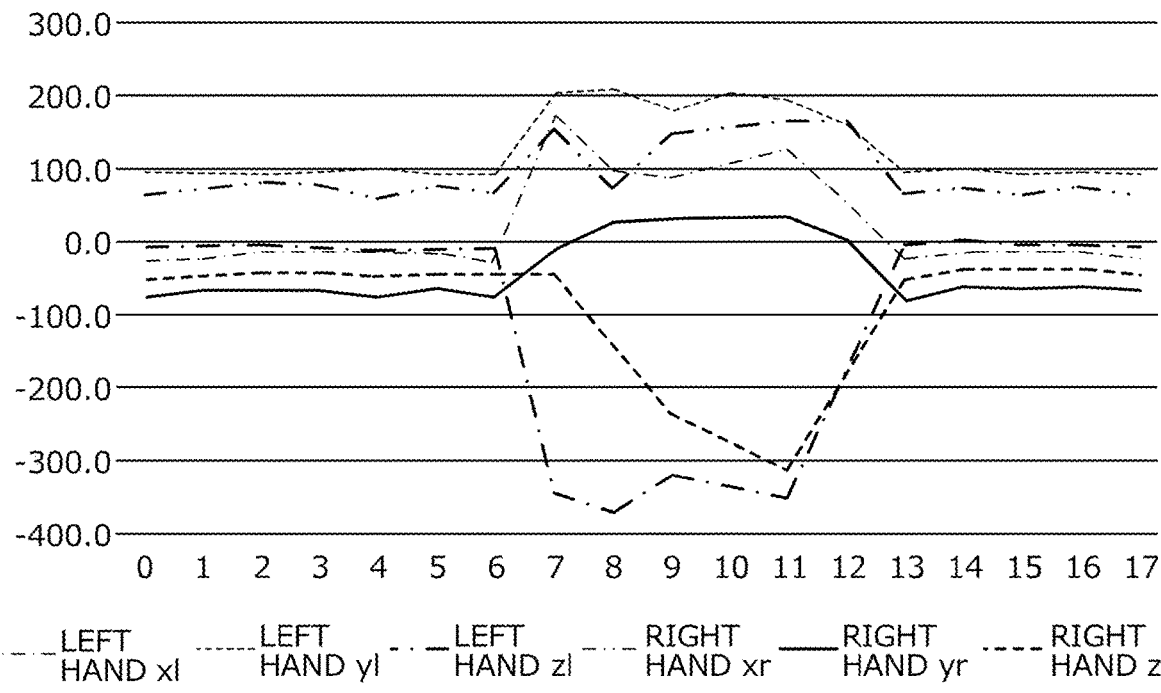

In FIG. 14, the time series of the coordinate information (xl, yl, zl) about the left-hand skeletal part illustrated in FIG. 13 and the time series of the coordinate information (xr, yr, zr) about the right-hand skeletal part illustrated in FIG. 13 are illustrated in a graph 1400. The ordinate axis of the graph 1400 indicates pixel. The abscissa axis of the graph 1400 indicates the second. Next, the description moves on to FIG. 15.

In FIG. 15, coordinate information (xa, ya, za, xb, yb, zb) obtained by transforming the coordinate information (xl, yl, zl) about the left-hand skeletal part and the coordinate information (xr, yr, zr) about the right-hand skeletal part in the frames of the respective seconds of the leftward video data is illustrated in a table 1500.

The table 1500 has fields of the second, xa, ya, za, xb, yb, and zb. In each field of the second, the number of seconds indicating to which second the frame of the leftward video data belongs is set.

In each field of xa, the coordinate value xa with respect to the Xa-axis in the frame of the above number of seconds is set. The unit of the coordinate value xa is pixel, for example. In each field of ya, the coordinate value ya with respect to the Ya-axis in the frame of the above number of seconds is set. The unit of the coordinate value ya is pixel, for example. In each field of za, the coordinate value za with respect to the Za-axis in the frame of the above number of seconds is set. The unit of the coordinate value za is pixel, for example.

In each field of xb, the coordinate value xb with respect to the Xb-axis in the frame of the above number of seconds is set. The unit of the coordinate value xb is pixel, for example. In each field of yb, the coordinate value yb with respect to the Yb-axis in the frame of the above number of seconds is set. The unit of the coordinate value yb is pixel, for example. In each field of zb, the coordinate value zb with respect to the Zb-axis in the frame of the above number of seconds is set. The unit of the coordinate value zb is pixel, for example.

Here, coordinate information (xa, ya, za, xb, yb, zb) obtained by transforming the coordinate information (xl, yl, zl) about the left-hand skeletal part and the coordinate information (xr, yr, zr) about the right-hand skeletal part in the frames of the respective seconds of the rightward video data has the same values as those illustrated in the table 1500. Next, the description moves on to FIG. 16.

Figure 16:
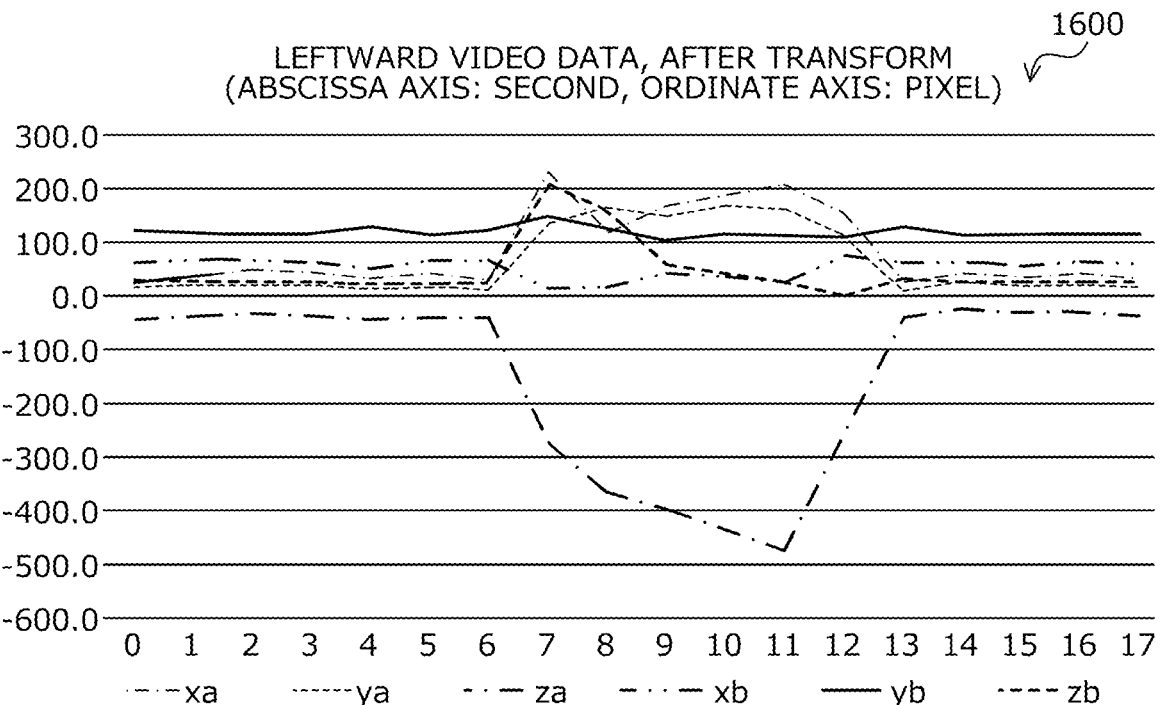
FIG. 16 is graphs for explaining and illustrating an example of numerical values indicating effects of the information processing device 100 (part 6)
Figure 16:
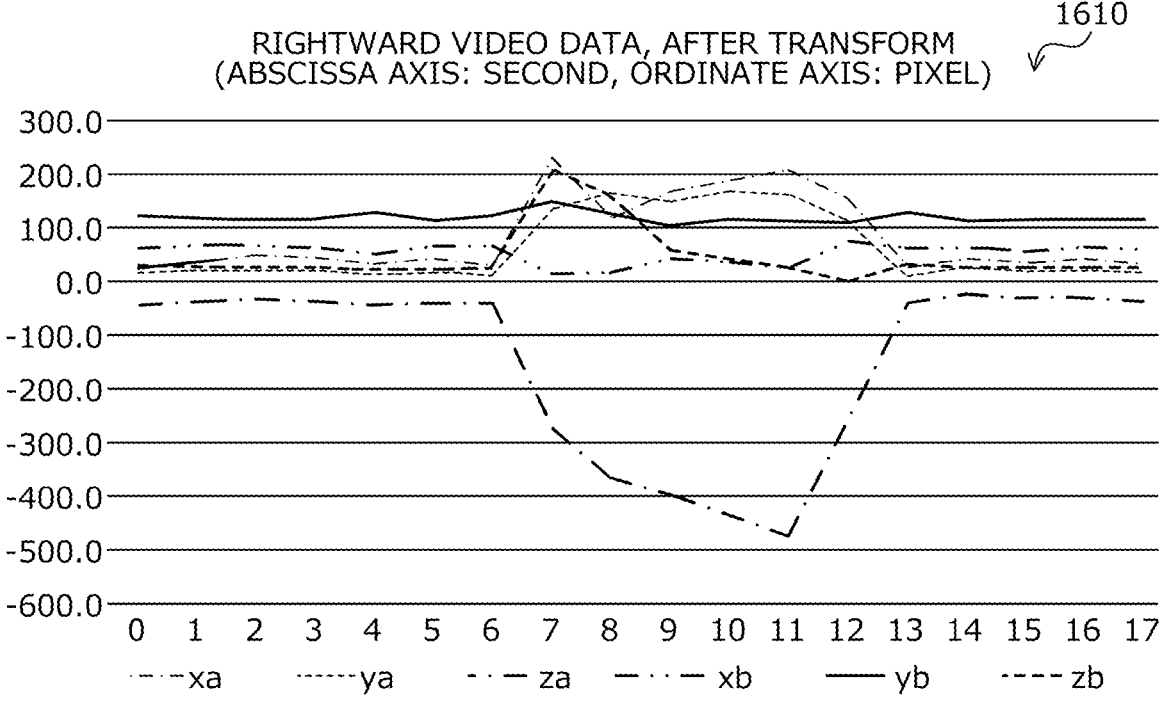

In FIG. 16, the time series of the coordinate information (xa, ya, za, xb, yb, zb) in the leftward video data is illustrated in a graph 1600. The ordinate axis of the graph 1600 indicates pixel. The abscissa axis of the graph 1600 indicates the second. Further, the time series of the coordinate information (xa, ya, za, xb, yb, zb) in the rightward video data is illustrated in a graph 1610. The ordinate axis of the graph 1610 indicates pixel. The abscissa axis of the graph 1610 indicates the second.

As illustrated in FIGS. 15 and 16, the time series of the coordinate information (xa, ya, za, xb, yb, zb) in the leftward video data and the time series of the coordinate information (xa, ya, za, xb, yb, zb) in the rightward video data are the same.

As a result, the information processing device 100 can accurately indicate the feature of a posture or a movement of the person with the coordinate information (xa, ya, za, xb, yb, zb), while handling bilaterally symmetrical postures or movements of the person as the same postures or movements. The information processing device 100 can leave information amounts other than the left and right distinctions in the coordinate information (xa, ya, za, xb, yb, zb). Thus, based on the coordinate information (xa, ya, za, xb, yb, zb), the information processing device 100 can train the action recognition model 620 capable of accurately recognizing actions of the same type related to the two respective skeletal parts that form a pair of left and right skeletal parts as the same actions.

Figure 18:
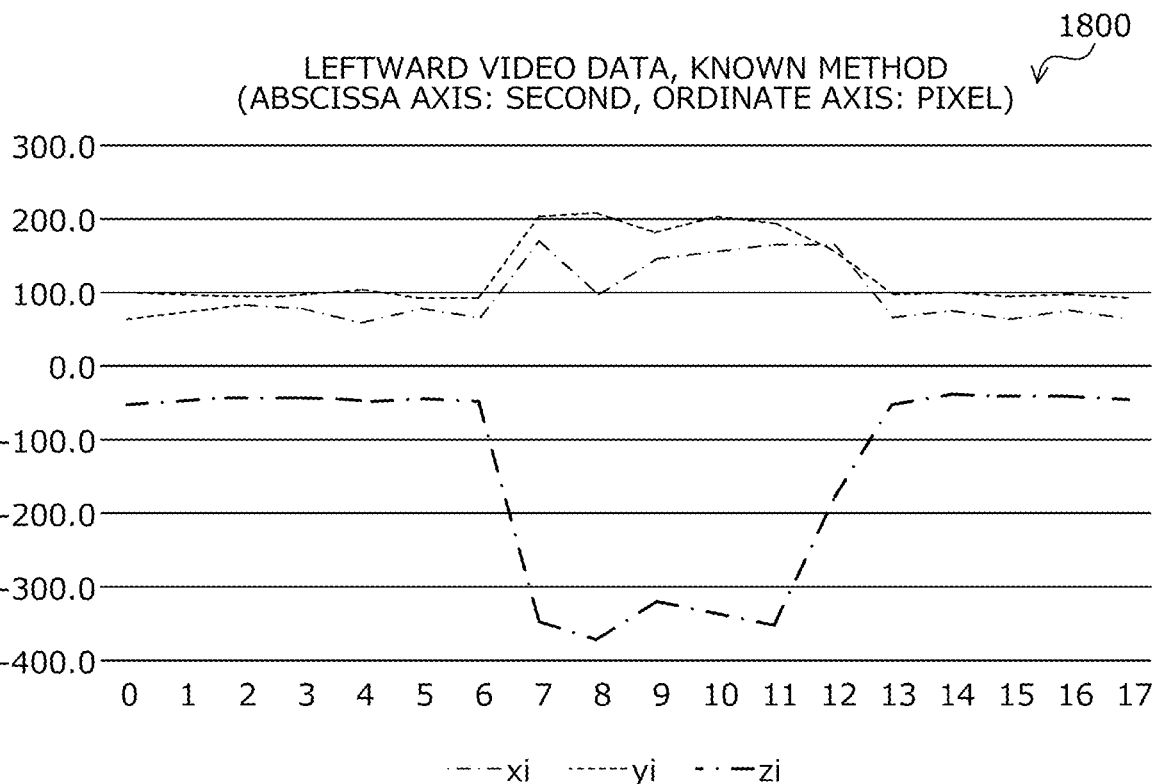
FIG. 18 is graphs for explaining and illustrating an example of numerical values indicating effects of the information processing device 100 (part 8)
Figure 18:
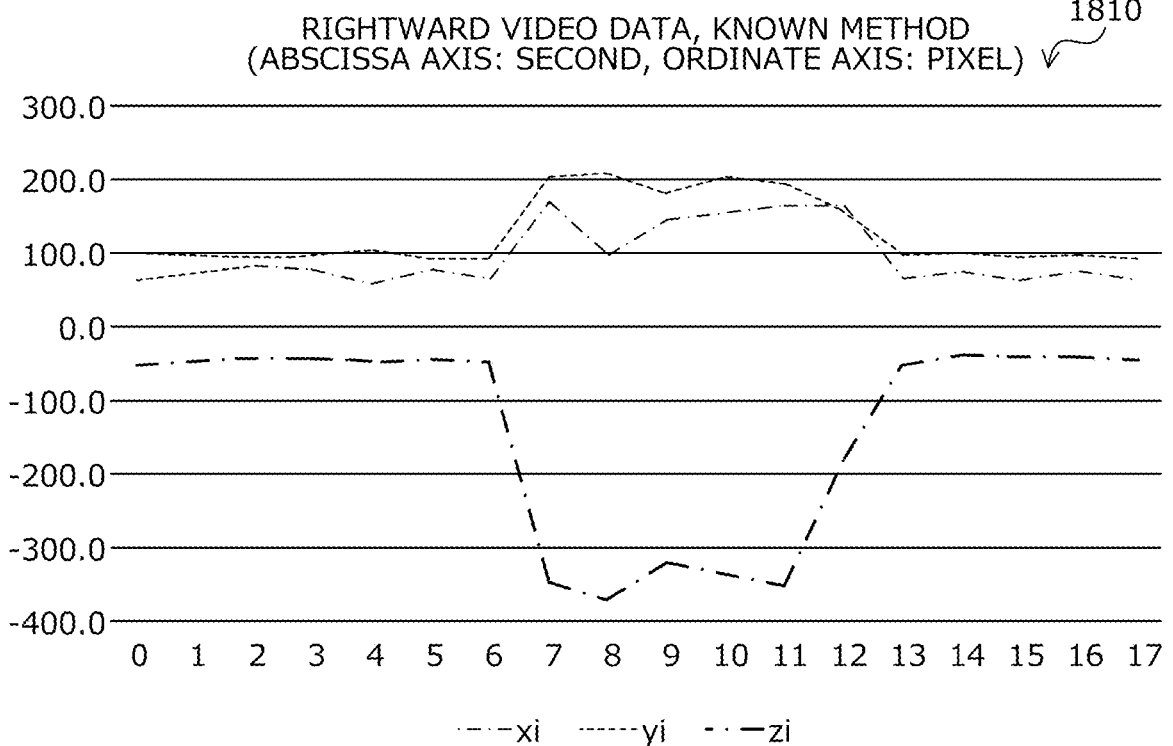

Next, the description moves on to FIGS. 17 and 18, and a case where the method implemented by the information processing device 100 is compared with a known method is described. The known method is, for example, a method by which the coordinate value having the greater absolute value between the coordinate value indicating the position of the right hand and the coordinate value indicating the position of the left hand is adopted as the coordinate value indicating the position of a hand.

In FIG. 17, coordinate information (xi, yi, zi) obtained by transforming the coordinate information (xl, yl, zl) about the left-hand skeletal part and the coordinate information (xr, yr, zr) about the right-hand skeletal part in the frames of the respective seconds of the leftward video data by the known method is illustrated in a table 1700. The value of xi is the absolute value of xl or xr, whichever is greater. The value of yi is the absolute value of yl or yr, whichever is greater. The value of zi is the absolute value of zl or zr, whichever is greater.

The table 1700 has fields of the second, xi, yi, and zi. In each field of the second, the number of seconds indicating to which second the frame of the leftward video data belongs is set.

In each field of xi, the coordinate value xi in the frame of the above number of seconds is set. The unit of the coordinate value xi is pixel, for example. In each field of yi, the coordinate value yi in the frame of the above number of seconds is set. The unit of the coordinate value yi is pixel, for example. In each field of zi, the coordinate value zi in the frame of the above number of seconds is set. The unit of the coordinate value zi is pixel, for example.

Here, coordinate information (xi, yi, zi) obtained by transforming the coordinate information (xl, yl, zl) about the left-hand skeletal part and the coordinate information (xr, yr, zr) about the right-hand skeletal part in the frames of the respective seconds of the rightward video data by the known method has the same values as those illustrated in the table 1700. Next, the description moves on to FIG. 18.

In FIG. 18, the time series of the coordinate information (xi, yi, zi) in the leftward video data is illustrated in a graph 1800. The ordinate axis of the graph 1800 indicates pixel. The abscissa axis of the graph 1800 indicates the second. Further, the time series of the coordinate information (xi, yi, zi) in the rightward video data is illustrated in a graph 1810. The ordinate axis of the graph 1810 indicates pixel. The abscissa axis of the graph 1810 indicates the second.

As illustrated in FIGS. 17 and 18, the time series of the coordinate information (xi, yi, zi) in the leftward video data and the time series of the coordinate information (xi, yi, zi) in the rightward video data are the same. However, by the known method, information amounts other than the left and right distinctions might be missing from the coordinate information (xi, yi, zi) with respect to the coordinate information (xl, yl, zl) about the left-hand skeletal part and the coordinate information (xr, yr, zr) about the right-hand skeletal part.

Specifically, as illustrated in FIGS. 12 and 14, the graph 1200 and the graph 1400 illustrate the feature that the z-coordinate value of one hand becomes smaller around the seventh second, but the z-coordinate value of the other hand does not become smaller as much as the z-coordinate value of the one hand. On the other hand, as illustrated in FIG. 18, by the known method, the feature that the z-coordinate value of one hand becomes smaller in the coordinate value zi around the seventh second remains in the time series of the coordinate information (xi, yi, zi), but the feature that the z-coordinate value of the other hand does not become smaller is missing.

Meanwhile, as illustrated in FIG. 16, the information processing device 100 can express commonality and differ-ence between the coordinate value zl and the coordinate value zr, with the coordinate value za and the coordinate value zb. Thus, the information processing device 100 can leave, in the coordinate information (za, zb), the feature that the z-coordinate value of one hand decreases around the seventh second, though the z-coordinate value of the other hand does not decrease as much as the z-coordinate value of the one hand.

Accordingly, compared with the known method, the information processing device 100 can train more easily the action recognition model 620 capable of accurately recognizing actions of the same type related to the two respective skeletal parts that form a pair of left and right skeletal parts as the same actions. Next, the description moves on to FIGS. 19 and 20, and a case where the information processing device 100 trains and examines the action recognition model 620, based on the correct answer labels corresponding to the leftward video data and correct answer labels corresponding to the rightward video data is described.

In FIG. 19, the correct answer labels corresponding to the leftward video data are illustrated in a table 1900. The table 1900 has fields of time and presence/absence of an action. In each field of time, the number of seconds indicating to which second the frame of the leftward video data belongs is set. In each field of presence/absence of an action, a correct answer label indicating whether a person has performed a specific action in the above frame is set. The specific action is an action in which a person bends down and picks up an object with one hand. When its value is 0, the correct answer label indicates that the specific action is not performed. When its value is 1, the correct answer label indicates that the specific action has been performed.

Further, the correct answer labels corresponding to the rightward video data are illustrated in a table 1910. The table 1910 has fields of time and presence/absence of an action. In each field of time, the number of seconds indicating to which second the frame of the rightward video data belongs is set. In each field of presence/absence of an action, a correct answer label indicating whether a person has performed a specific action in the above frame is set. The specific action is an action in which a person bends down and picks up an object with one hand. When its value is 0, the correct answer label indicates that the specific action is not performed. When its value is 1, the correct answer label indicates that the specific action has been performed.

Here, the frames whose number of seconds are not mod 3=1 are set as the training target, and the frames whose number of seconds are mod 3=1 are set as the test target. The number of seconds mod 3=1 is specifically the number of seconds=1, 4, 7, 10, 13, or 16. It is assumed herein that the information processing device 100 has trained the action recognition model 620, based on of model training data obtained by combining the coordinate information (xa, ya, za, xb, yb, zb) in the respective frames to be trained and the correct answer labels.

Also, it is assumed herein that, as a comparison target of the action recognition model 620, an existing model is trained based on existing training data obtained by combining coordinate information (xi, yi, zi) obtained by the known method and correct answer labels in the respective frames of the training target. Here, the description moves on to FIG. 20.

In FIG. 20, the information processing device 100 estimates the presence/absence of an action in each frame of the test target, using the action recognition model 620. Specifically, the information processing device 100 acquires the result of estimation of the presence/absence of an action by inputting the coordinate information (xa, ya, za, xb, yb, zb) in each frame of the test target to the action recognition model 620. The results of estimation of the presence/absence of an action using the action recognition model 620 are illustrated in a table 2000.

The table 2000 has fields of time, correct answer, and estimation result. In each field of time, the number of seconds corresponding to the number of seconds mod 3=1 is set. In each field of correct answer, the correct answer label in the frame of the above number of seconds is set. In each field of estimation result, the result of estimation of the presence/absence of an action using the action recognition model 620 in the frame of the above number of seconds is set. When its value is 0, the estimation result indicates that the specific action is not performed. When its value is 1, the estimation result indicates that the specific action has been performed.

Further, the results of estimation of the presence/absence of an action using the existing model as the comparison target of a result of estimation of the presence/absence of an action using the action recognition model 620 are illustrated in a table 2010. The table 2010 has fields of time, correct answer, and estimation result. In each field of time, the number of seconds corresponding to the number of seconds mod 3=1 is set. In each field of correct answer, the correct answer label in the frame of the above number of seconds is set. In each field of estimation result, the result of estimation of the presence/absence of an action using the existing model in the frame of the above number of seconds is set. When its value is 0, the estimation result indicates that the specific action is not performed. When its value is 1, the estimation result indicates that the specific action has been performed.

As described above, by the known method, erroneous estimation occurs, and Recall=1.0 and Precision=0.5 (the F-number being 0.667) are obtained. Specifically, it is considered that, by the known method, the feature that the z-coordinate value of one hand becomes smaller and the z-coordinate value of the other hand does not become smaller in the coordinate value $z_i$ around the seventh second is missing as described above, and therefore, erroneous estimation has occurred.

On the other hand, the information processing device 100 can make the results of estimation of the presence/absence of an action using the action recognition model 620 equal to the values matching the correct answer labels. The information processing device 100 can set Recall=Precision=1.0 (the F-number being 1.0). As described above, compared with the known method, the information processing device 100 can train more easily the action recognition model 620 capable of accurately recognizing actions of a person, and thus, can recognize actions of a person more accurately.

Training Processing Procedures

Figure 21:
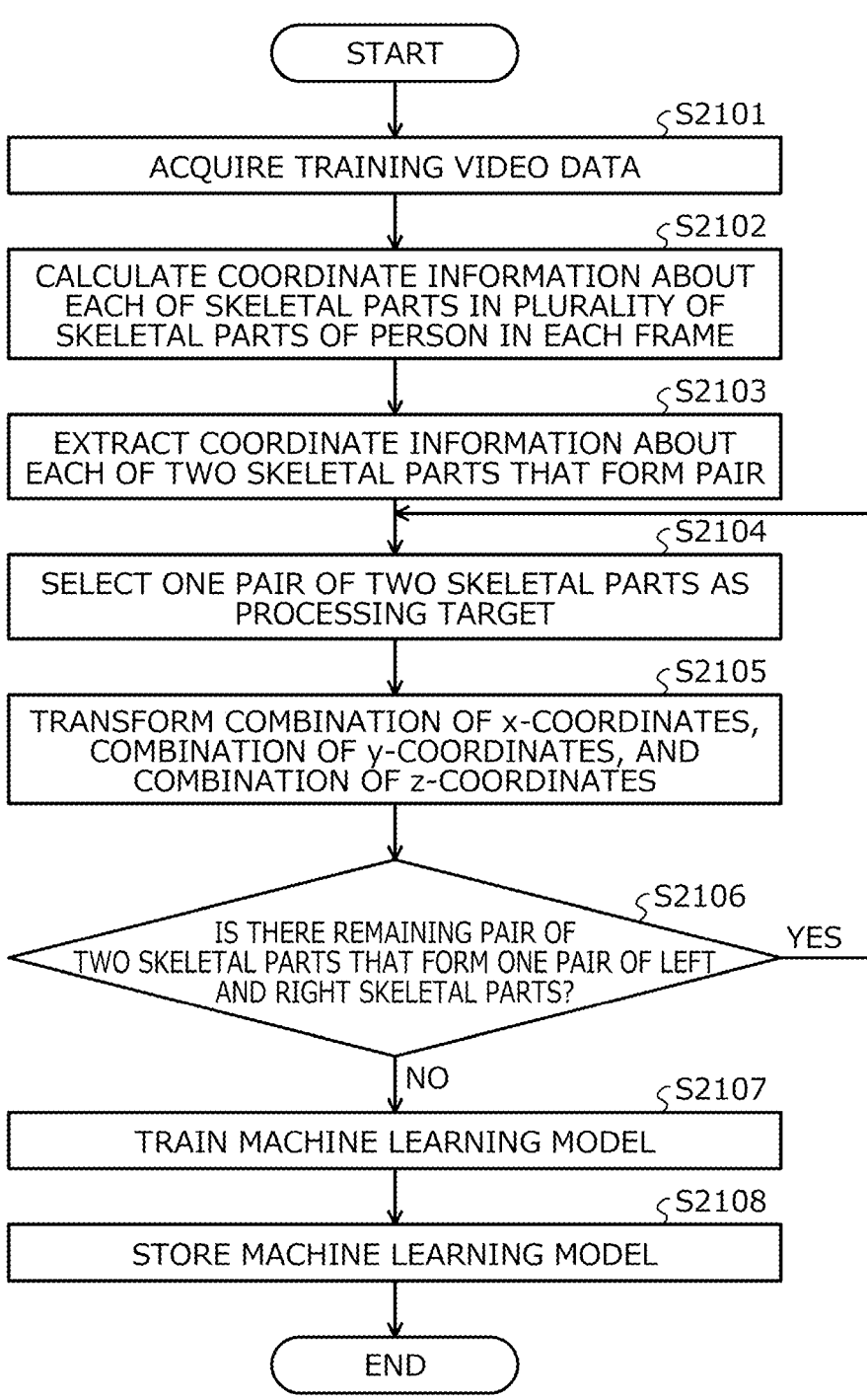
FIG. 21 is a flowchart illustrating an example of training processing procedures.

Next, referring to FIG. 21, an example of training processing procedures to be carried out by the information processing device 100 is described. A training process is performed by, for example, the CPU 301, a storage area such as the memory 302 or the recording medium 305, and the network I/F 303 illustrated in FIG. 3.

FIG. 21 is a flowchart illustrating an example of the training processing procedures. In FIG. 21, the information processing device 100 acquires the training video data 601 (step S2101).

Next, based on the training video data 601, the information processing device 100 recognizes the person appearing in each frame of the training video data 601 using a DL model, and calculates the coordinate information about each skeletal part in a plurality of skeletal parts of the person in each frame (step S2102).

Next, for each pair of two skeletal parts forming a pair of left and right skeletal parts in the coordinate information about the respective skeletal parts in the plurality of skeletal parts of the person in each frame, the information processing device 100 extracts the coordinate information about each of the two skeletal parts forming the pair (step S2103).

Next, the information processing device 100 selects one pair of two skeletal parts forming a pair of left and right skeletal parts as the processing target (step S2104). Next, the information processing device 100 transforms the combination of x-coordinates, the combination of y-coordinates, and the combination of z-coordinates in the coordinate information about the two skeletal parts of the selected pair, into a combination of coordinates in a special orthogonal coordinate system that does not depend on whether the target is on the left side and the right side (step S2105).

Next, the information processing device 100 determines whether there remains a pair of two skeletal parts forming a pair of left and right skeletal parts that have not yet been selected (step S2106). Here, if there remains a pair of two skeletal parts forming a pair of left and right skeletal parts (step S2106: Yes), the information processing device 100 returns to the process in step S2104. If there remain no pairs of two skeletal parts forming pairs of left and right skeletal parts (step S2106: No), on the other hand, the information processing device 100 moves on to the process in step S2107.

In step S2107, the information processing device 100 trains a machine learning model, based on a combination of an input sample including the transformed combination of coordinates as an explanatory variable and annotation data serving as correct answer data (step S2107).

Next, the information processing device 100 stores the trained machine learning model (step S2108). Then, the information processing device 100 ends the training process.

Recognition Processing Procedures

Figure 22:
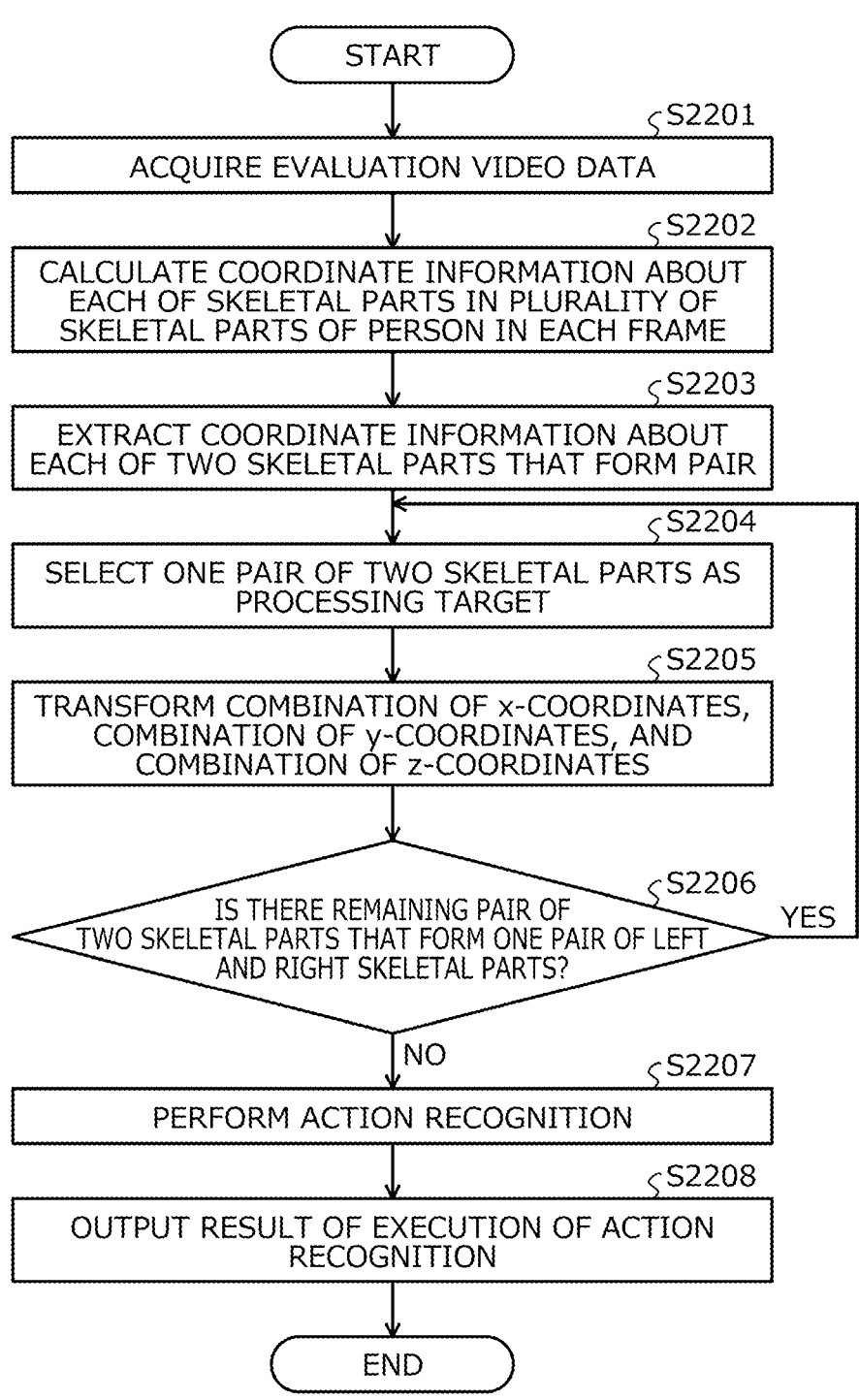
FIG. 22 is a flowchart illustrating an example of recognition processing procedures.

Next, referring to FIG. 22, an example of recognition processing procedures to be carried out by the information processing device 100 is described. A recognition process is performed by, for example, the CPU 301, a storage area such as the memory 302 or the recording medium 305, and the network I/F 303 illustrated in FIG. 3.

FIG. 22 is a flowchart illustrating an example of the recognition processing procedures. In FIG. 22, the information processing device 100 acquires the evaluation video data 602 (step S2201).

Next, based on the evaluation video data 602, the information processing device 100 recognizes the person appearing in each frame of the evaluation video data 602 using a DL model, and calculates the coordinate information about each skeletal part in a plurality of skeletal parts of the person in each frame (step S2202).

Next, for each pair of two skeletal parts forming a pair of left and right skeletal parts in the coordinate information about the respective skeletal parts in the plurality of skeletal parts of the person in each frame, the information processing device 100 extracts the coordinate information about each of the two skeletal parts forming the pair (step S2203).

Next, the information processing device 100 selects one pair of two skeletal parts forming a pair of left and right skeletal parts as the processing target (step S2204). Next, the information processing device 100 transforms the combination of x-coordinates, the combination of y-coordinates, and the combination of z-coordinates in the coordinate information about the two skeletal parts of the selected pair, into a combination of coordinates in a special orthogonal coordinate system that does not depend on whether the target is on the left side or the right side (step S2205).

Next, the information processing device 100 determines whether there remains a pair of two skeletal parts forming a pair of left and right skeletal parts that have not yet been selected (step S2206). Here, if there remains a pair of two skeletal parts forming a pair of left and right skeletal parts (step S2206: Yes), the information processing device 100 returns to the process in step S2204. If there remain no pairs of two skeletal parts forming a pair of left and right skeletal parts (step S2206: No), on the other hand, the information processing device 100 moves on to the process in step S2207.

In step S2207, using a trained machine learning model, the information processing device 100 performs action recognition, based on input data including the transformed combination of coordinates as an explanatory variable (step S2207).

Next, the information processing device 100 outputs the result of execution of the action recognition (step S2208). Then, the information processing device 100 ends the recognition process.

Here, in performing the processes, the information processing device 100 may switch some of the steps in the process sequences in the respective flowcharts in FIGS. 21 and 22. Further, the information processing device 100 may omit the processes in some of the steps in the respective flowcharts in FIGS. 21 and 22.

As described above, with the information processing device 100, a video image in which the first person appears may be acquired. With the information processing device 100, it is possible to analyze the acquired video image, to identify the positional information about each of the two body parts that form a pair of body parts among the body parts of the first person in the video image. With the information processing device 100, it is possible to generate the first component indicating the sum of the identified positional information about the respective body parts. With the information processing device 100, it is possible to generate the third component indicating the absolute value of the second component indicating the difference between the identified pieces of the positional information about the respective body parts. With the information processing device 100, it is possible to train a model that outputs posture information about the second person from a video image in which the second person appears, based on the generated first component and the generated third component. In this manner, the information processing device 100 may be able to easily train a model that estimates the posture information about the second person from the video image in which the second person appears.

With the information processing device 100, it is possible to train a model, based on the generated first component, the second component, and the generated third component. In this manner, the information processing device 100 may be able to easily train a model that estimates the posture information about the second person from the video image in which the second person appears, taking the second component also into consideration.

With the information processing device 100, it is possible to analyze an acquired video image, to identify the positional information indicating a plurality of component values in axial directions different from each other, the component values indicating the positions of the respective body parts in a multidimensional space in the video image. As a result, the information processing device 100 may be able to cope with a case where positional information indicates a plurality of component values in axial directions different from each other, the component values indicating positions in a multidimensional space. The information processing device 100 may train a model that uses positional information indicating a plurality of component values in axial directions different from each other, the component values indicating positions in a multidimensional space.

With the information processing device 100, it is possible to calculate, for each axial direction, an index value using the sum of the component values in the axial direction indicated by the positional information about the respective body parts, and generates the first component by combining the calculated index values. With the information processing device 100, it is possible to calculate, for each axial direction, an index value using the difference between the component values in the axial direction indicated by the positional information about the respective body parts, and generates the third component by combining the absolute values of the calculated index values. As a result, the information processing device 100 may accurately generate the first component and the third component in a case where positional information indicates a plurality of component values in axial directions different from each other, the component values indicating positions in a multidimensional space.

With the information processing device 100, it is possible to calculate, for each axial direction, an index value using the difference between the component values in the axial direction indicated by the positional information about the respective body parts, and generates the second component by combining the calculated index values. With the information processing device 100, it is possible to train a model, based on the generated first component, the generated second component, and the generated third component. As a result, the information processing device 100 may accurately generate the second component in a case where positional information indicates a plurality of component values in axial directions different from each other, the component values indicating positions in a multidimensional space.

With the information processing device 100, a combination of different body parts that form a pair of left and right body parts may be adopted as the two body parts. Thus, the information processing device 100 may train a model capable of recognizing actions of the same type of the second person using different body parts that form a pair of left and right body parts, as the same actions.

With the information processing device 100, it is possible to analyze the video image in which the second person appears, to identify the positional information about each of the two body parts that form a pair of body parts among the body parts of the second person in the video image. With the information processing device 100, it is possible to generate the fourth component indicating the sum of the pieces of positional information about the respective body parts of the two body parts forming a pair, and the sixth component indicating the absolute value of the fifth component indicating the difference between the pieces of positional information about the respective body parts of the two body parts forming a pair. With the information processing device 100, it is possible to acquire posture information about the second person, using the trained model, based on the generated fourth component and the generated sixth component. Thus, the information processing device 100 may accurately estimate posture information about the second person.

With the information processing device 100, it is possible to analyze an acquired video image, to identify the positions of skeletal parts of the first person in the video image, and identify the positional information about the respective body parts, based on the identified positions of the skeletal parts. Thus, the information processing device 100 may identify the positional information about the respective body parts related to the posture of the first person, utilizing a method for identifying the positions of skeletal parts.

With the information processing device 100, information indicating whether the second person is in a posture corresponding to a specific action may be adopted as the posture information. Thus, the information processing device 100 may be able to determine whether the second person is in a posture corresponding to a specific action, and be able to determine whether the second person has performed the specific action.

Note that the information processing method described in this embodiment may be implemented by a computer such as a PC or a workstation executing a program prepared beforehand. The information processing program described in this embodiment is recorded in a computer-readable recording medium, and is read from the recording medium by a computer to execute the program. The recording medium is a hard disk, a flexible disk, a compact disc (CD)-ROM, a magneto optical disc (MO), a digital versatile disc (DVD), or the like. Alternatively, the information processing program described in this embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:

acquiring a video image in which a first person appears;

identifying, for each body part of two body parts that form a pair of left and right body parts among body parts of the first person in the video image, positional information indicating a position of the each body part by analyzing the acquired video image;

generating a first component that indicates a sum of two pieces of the identified positional information for the two body parts;

generating a third component that indicates an absolute value of a second component that indicates a difference in the two pieces of the identified positional information for the two body parts; and training a model that outputs posture information about a second person from a video image in which the second person appears, based on training data in which the generated first component and the generated third component are associated with a label indicating a correct action of the first person.

2. The non-transitory computer-readable recording medium according to claim 1, wherein the training includes training the model, based on the generated first component, the second component, and the generated third component.

3. The non-transitory computer-readable recording medium according to claim 1, wherein the identifying includes identifying positional information that indicates a plurality of component values in axial directions different from each other by analyzing the acquired video image, the component values indicating positions of the each body part in a multidimensional space in the video image.

4. The non-transitory computer-readable recording medium according to claim 3, wherein the generating the first component includes:

calculating, for each of the axial directions, an index value using a sum of component values in the axial direction, the component values being indicated by the positional information about each body part; and generating the first component by combining the calculated index values, and the generating the third component includes:

calculating, for each of the axial directions, an index value using a difference between component values in the axial direction, the component values being indicated by the positional information about each body part; and generating the third component by combining absolute values of the calculated index values.

5. The non-transitory computer-readable recording medium according to claim 1, wherein the two body parts are a combination of different body parts that form a pair of left and right body parts.

6. An information processing method implemented by a computer to execute processing comprising:

acquiring a video image in which a first person appears;

identifying, for each body part of two body parts that form a pair of left and right body parts among body parts of the first person in the video image, positional information indicating a position of the each body part by analyzing the acquired video image;

generating a first component that indicates a sum of two pieces of the identified positional information for the two body parts;

generating a third component that indicates an absolute value of a second component that indicates a difference in the two pieces of the identified positional information for the two body parts; and training a model that outputs posture information about a second person from a video image in which the second person appears, based on training data in which the generated first component and the generated third component are associated with a label indicating a correct action of the first person.

7. An information processing apparatus comprising:

memory; and processor circuitry coupled to the memory, the processor circuitry being configured to perform processing including:

acquiring a video image in which a first person appears;

identifying, for each body part of two body parts that form a pair of left and right body parts among body parts of the first person in the video image, positional information indicating a position of the each body part by analyzing the acquired video image;

generating a first component that indicates a sum of two pieces of the identified positional information for the two body parts;

generating a third component that indicates an absolute value of a second component that indicates a difference in the two pieces of the identified positional information for the two body parts; and training a model that outputs posture information about a second person from a video image in which the second person appears, based on training data in which the generated first component and the generated third component are associated with a label indicating a correct action of the first person.

\* \* \* \* \*